US012356437B2

(12) United States Patent
Manolakos et al.

(10) Patent No.: US 12,356,437 B2
(45) Date of Patent: Jul. 8, 2025

(54) SRS POSITIONING BWP IN RRC INACTIVE OR IDLE POSITIONING

(71) Applicant: QUALCOMM Incorporated, San Diego, CA (US)

(72) Inventors: Alexandros Manolakos, Escondido, CA (US); Peter Gaal, San Diego, CA (US); Carlos Cabrera Mercader, Cardiff, CA (US); Jae Ho Ryu, San Diego, CA (US); Yongle Wu, San Diego, CA (US); Chun-Hao Hsu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/804,528

(22) Filed: May 27, 2022

(65) Prior Publication Data
US 2023/0224934 A1    Jul. 13, 2023

Related U.S. Application Data

(60) Provisional application No. 63/266,627, filed on Jan. 10, 2022.

(51) Int. Cl.
*H04W 72/51* (2023.01)
*H04L 5/00* (2006.01)
*H04L 27/26* (2006.01)
*H04W 72/044* (2023.01)

(52) U.S. Cl.
CPC ........... *H04W 72/51* (2023.01); *H04L 5/0051* (2013.01); *H04L 27/26025* (2021.01); *H04L 27/2607* (2013.01); *H04W 72/044* (2013.01)

(58) Field of Classification Search
None
See application file for complete search history.

(56) References Cited

U.S. PATENT DOCUMENTS

2019/0165971 A1* 5/2019 Manolakos ........... H04W 72/23
2022/0252690 A1* 8/2022 Zhou ................... H04W 56/004

FOREIGN PATENT DOCUMENTS

WO    WO-2010126852 A1 * 11/2010   ........... H04L 5/0051

OTHER PUBLICATIONS

3GPP TSG RAN WG1 #107-e, (Nov. 11-19, 2021_ R1-2111529), UE Features for NR Positioning Enhancements (Year: 2021).*
(Continued)

*Primary Examiner* — Christine T Duong
(74) *Attorney, Agent, or Firm* — QUALCOMM Incorporated

(57) ABSTRACT

Methods, apparatuses, and computer-readable storage medium for wireless communication are provided. An example method may include transmitting, to a network entity, a capability for a transmission of one or more positioning SRS outside of an initial UL BWP during an idle state or an inactive state of the UE. The example method may further include receiving, from the network entity, a configuration for the transmission of the one or more positioning SRS outside of the initial UL BWP during the idle state or the inactive state. The example method may further include transmitting, to the network entity based on the configuration, the one or more positioning SRS outside of the initial UL BWP.

34 Claims, 17 Drawing Sheets

(56) References Cited

OTHER PUBLICATIONS

Intel Corporation: "UE Features for NR Positioning Enhancements", 3GPP TSG RAN WG1 #107-e, R1-2111529, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, pp. 1-10, XP052074944, p. 1.
International Search Report and Written Opinion—PCT/US2022/053090—ISA/EPO—Apr. 18, 2023.
OPPO: "UE Features for NR Positioning Enhancements", 3GPP TSG RAN WG1 #107-e, R1-2111295, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 5, 2021, 7 pages, XP052074188, p. 5.
RAN WG1: "LS on Configuration and Transmission of SRS for Positioning in RRC_INACTIVE State", 3GPP TSG RAN WG1 #107-e, R1-2112846, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 20, 2021, pp. 1-2, XP052098045.

\* cited by examiner

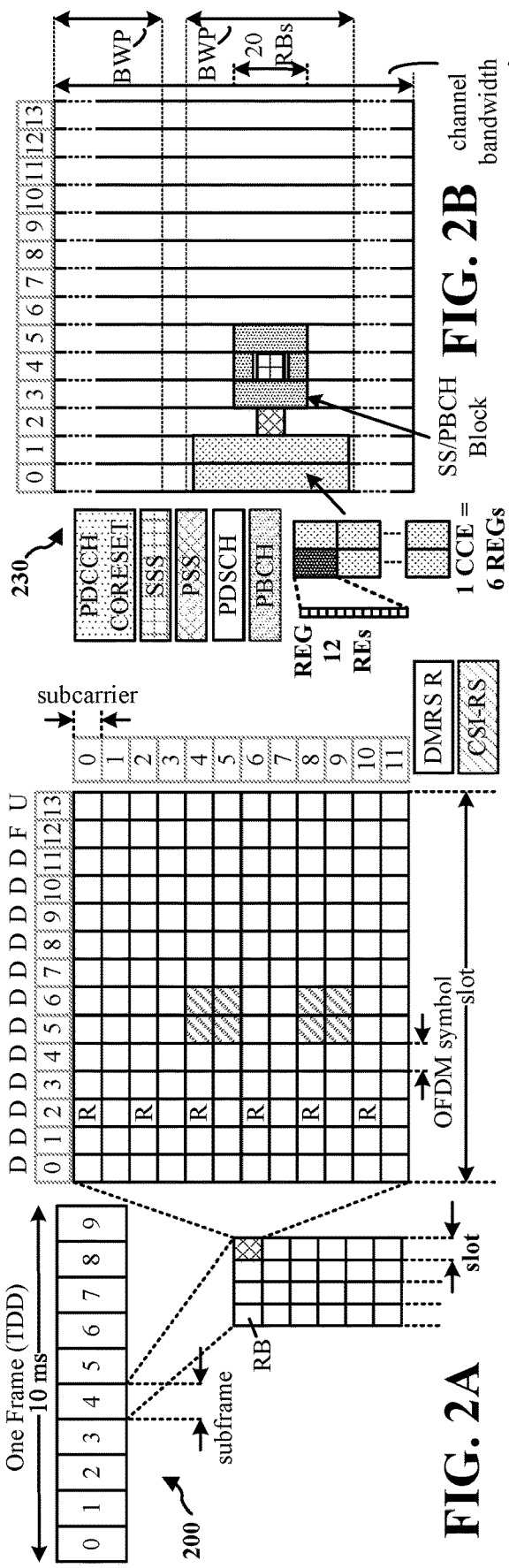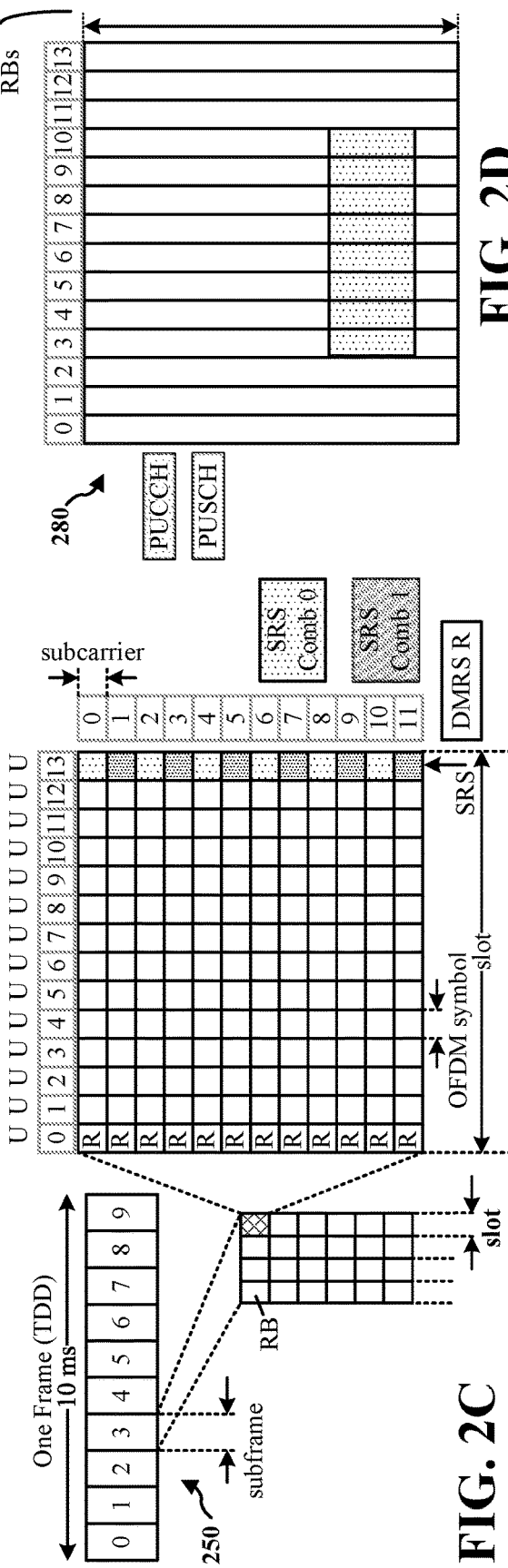
FIG. 2A
FIG. 2B
FIG. 2C
FIG. 2D

SRS POSITIONING BWP IN RRC INACTIVE OR IDLE POSITIONING

CROSS REFERENCE TO RELATED APPLICATION(S)

This application claims the benefit of and priority to U.S. Provisional Application Ser. No. 63/266,627, entitled "SRS POSITIONING BWP IN RRC INACTIVE OR IDLE POSITIONING" and filed on Jan. 10, 2022, which is assigned to the assignee hereof and expressly incorporated by reference herein in its entirety.

TECHNICAL FIELD

The present disclosure relates generally to communication systems, and more particularly, to wireless communication systems with positioning sounding reference signals (SRS) outside of an initial uplink (UL) bandwidth part (BWP).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to transmit, to a network entity, a capability for a transmission of one or more positioning SRS outside of an initial UL BWP during an idle state or an inactive state of the UE. The memory and the at least one processor coupled to the memory may be further configured to receive, from the network entity, a configuration for the transmission of the one or more positioning SRS outside of the initial UL BWP during the idle state or the inactive state, where the configuration includes a set of constraints on the transmission of the one or more positioning SRS. The memory and the at least one processor coupled to the memory may be further configured to transmit, to the network entity based on the configuration, the one or more positioning SRS outside of the initial UL BWP, where the one or more positioning SRS is transmitted during the idle state or the inactive state.

In an aspect of the disclosure, a method, a computer-readable medium, and an apparatus at a base station are provided. The apparatus may include a memory and at least one processor coupled to the memory. The memory and the at least one processor coupled to the memory may be configured to receive, from a UE, a capability for a transmission of one or more positioning SRS outside of an initial UL BWP during an idle state or an inactive state of the UE. The memory and the at least one processor coupled to the memory may be further configured to transmit a configuration for the transmission of the one or more positioning SRS outside of the initial UL BWP during the idle state or the inactive state, where the configuration includes a set of constraints on the transmission of the one or more positioning SRS. The memory and the at least one processor coupled to the memory may be further configured to receive, from the UE based on the configuration, the one or more positioning SRS outside of the initial UL BWP, where the one or more positioning SRS is received during the idle state or the inactive state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 1A and 4B are signal flow diagrams for connecting UE to a transmission/reception point (TRP).

DETAILED DESCRIPTION

Figure 1:
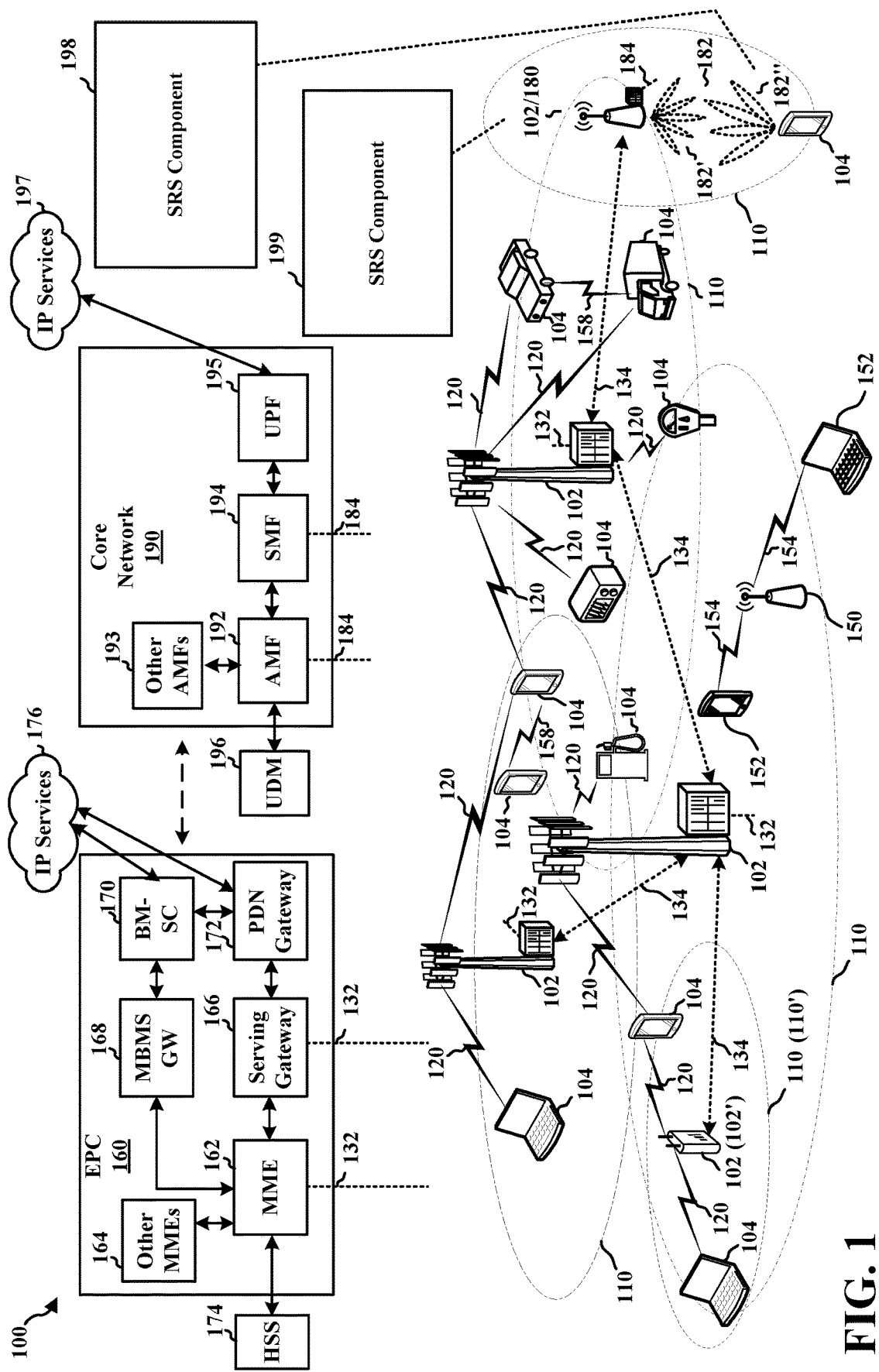
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a SRS component 198. In some aspects, the SRS component 198 may be configured to transmit, to a network entity, a capability for a transmission of one or more positioning SRS outside of an initial UL BWP during an idle state or an inactive state of the UE. In some aspects, the SRS component 198 may be further configured to receive, from the network entity, a configuration for the transmission of the one or more positioning SRS outside of the initial UL BWP during the idle state or the inactive state, where the configuration includes a set of constraints on the transmission of the one or more positioning SRS. In some aspects, the SRS component 198 may be further configured to transmit, to the network entity based on the configuration, the one or more positioning SRS outside of the initial UL BWP, where the one or more positioning SRS is transmitted during the idle state or the inactive state.

In certain aspects, the base station 180 may include a SRS component 199. In some aspects, the SRS component 199 may be configured to receive, from a UE, a capability for a transmission of one or more positioning SRS outside of an initial UL BWP during an idle state or an inactive state of the UE. In some aspects, the SRS component 199 may be further configured to transmit a configuration for the transmission of the one or more positioning SRS outside of the initial UL BWP during the idle state or the inactive state, where the configuration includes a set of constraints on the transmission of the one or more positioning SRS. In some aspects, the SRS component 199 may be further configured to receive, from the UE based on the configuration, the one or more positioning SRS outside of the initial UL BWP, where the one or more positioning SRS is received during the idle state or the inactive state.

Although the following description may be focused on 5G NR, the concepts described herein may be applicable to other similar areas, such as LTE, LTE-A, CDMA, wideband CDMA (WCDMA), global system for mobile communication (GSM), and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS)(indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
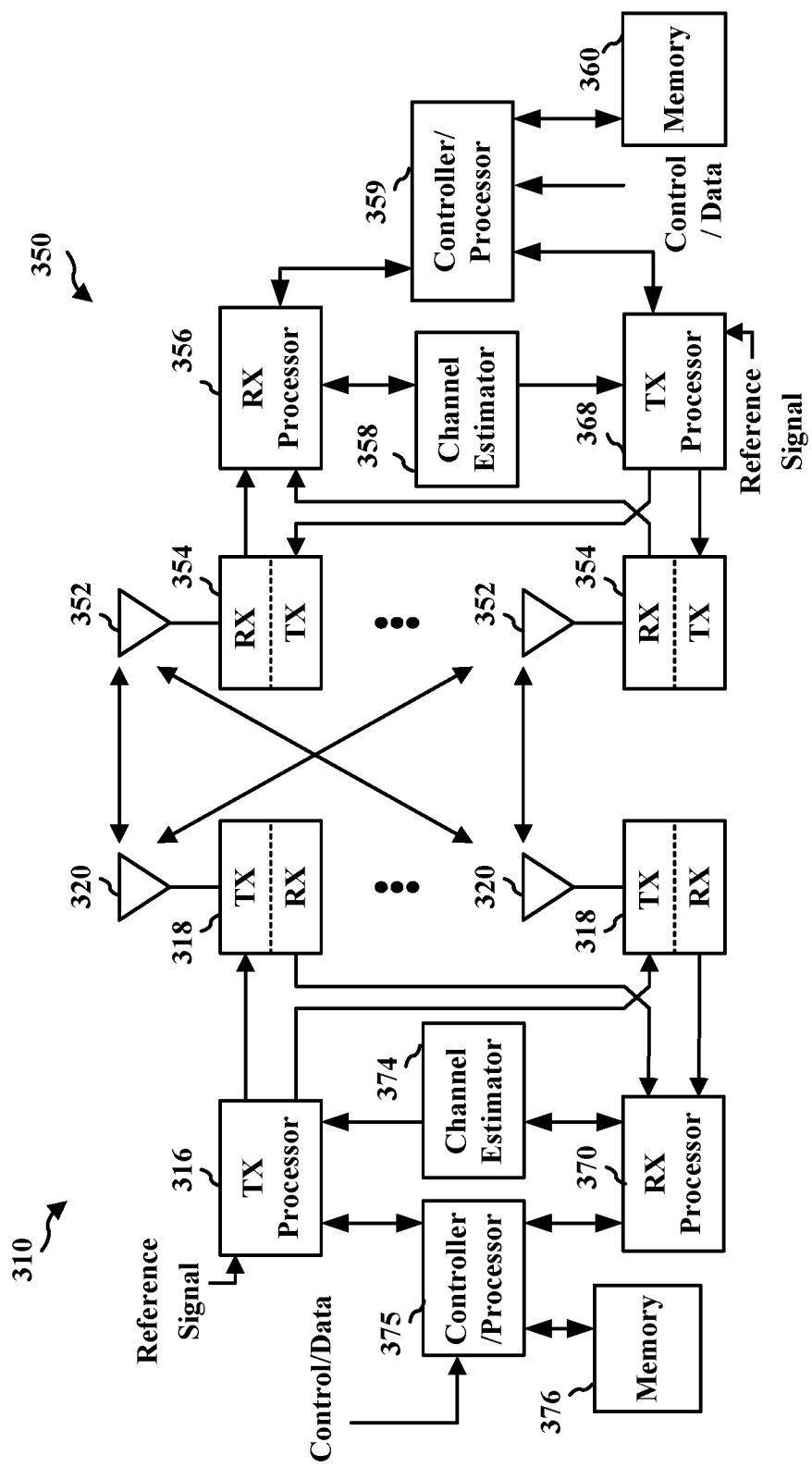
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters (e.g., TX in receiver 354). Each transmitter (e.g., TX in receiver 354) may modulate an RF carrier with a respective spatial stream for transmission.

The UL transmission is processed at the base station 310 in a manner similar to that described in connection with the receiver function at the UE 350. Each receiver (e.g., RX in transmitter 318) receives a signal through its respective antenna 320. Each receiver (e.g., RX in transmitter 318) recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SRS component 198 of FIG. 1.

At least one of the TX processor 316, the RX processor 370, and the controller/processor 375 may be configured to perform aspects in connection with SRS component 199 of FIG. 1.

A collection of resource elements that are used for transmission of SRS is referred to as an "SRS resource." The collection of resource elements can span multiple PRBs in the frequency domain and N (e.g., 1 or more) consecutive symbol(s) within a slot in the time domain. In a given OFDM symbol, an SRS resource occupies consecutive RBs. An SRS resource is described by at least the following parameters: SRS resource identifier (ID), sequence ID, comb size-N, resource element offset in the frequency domain, starting slot and starting symbol, number of symbols per SRS resource (i.e., the duration of the SRS resource), and quasi-collocation (QCL) information. Currently, one antenna port is supported. The comb size indicates the number of subcarriers in each symbol carrying SRS.

An "SRS resource set" may be a set of SRS resources used for the transmission of SRS signals, where each SRS resource has an SRS resource ID. In addition, the SRS resources in an SRS resource set are associated with the same UE. An SRS resource set is identified by an SRS resource set ID. An SRS resource ID in an SRS resource set is associated with a single beam (and/or beam ID) transmitted from a UE. That is, each SRS resource of an SRS resource set may be transmitted on a different beam.

An "SRS occasion" may be one instance of a periodically repeated time window (e.g., a group of one or more consecutive slots) where SRS are expected to be transmitted. An SRS occasion may also be referred to as an "SRS instance," "SRS positioning occasion," a "positioning occasion," or simply an "occasion."

A "BWP associated with SRS for positioning" or "BWP associated with positioning SRS" may be a defined BWP associated with SRS for positioning or may be a hypothetical BWP implicitly defined based on (e.g., by inheriting) the location and bandwidth parameter, SCS, or cyclic prefix (CP) configured for the SRS.

Note that the terms "sounding reference signal for positioning" and "positioning SRS" may sometimes refer to specific reference signals that are used for positioning in LTE systems. While the discussion herein refers to sounding reference signals and SRS, the discussion may be applied to other types of positioning signals. The term "positioning SRS" may refer to and may be used interchangeably with the term "SRS for positioning."

Figure 4A:
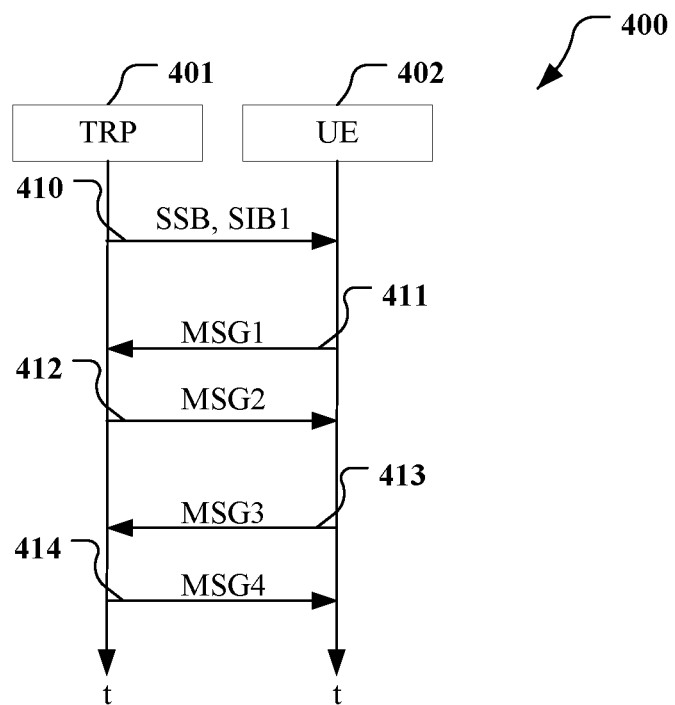

Referring to FIG. 4A, with further reference to FIGS. 1-3, a TRP 401 (e.g., of the base station 120) and a UE 402 (e.g., the UE 104) may be configured to communicate with each other according to a signal flow 400 to establish RRC connection of the UE 402 to a communication network (e.g., including base stations 102/180 shown in FIG. 1) including the TRP 401. A wireless device may include multiple TRPs. Each TRP may include different RF modules having a shared hardware and/or software controller. Each TRP may have separate RF and digital processing. Each TRP may also perform separate baseband processing. Each TRP may include a different antenna panel or a different set of antenna elements of a wireless device. The TRPs of the wireless device may be physically separated. The spacing between TRPs may vary based on the size of a vehicle and/or the number of TRPs associated with the vehicle. Each of the TRPs may experience a channel differently (e.g., experience a different channel quality) due to the difference physical location, the distance between the TRPs, different line-of-sight (LOS) characteristics (e.g., a LOS channel in comparison to a non-LOS (NLOS) channel), blocking/obstructions, interference from other transmissions, among other reasons. In some aspects, the signal flow 400 may be conducted while the UE 402 is in an unconnected state, in which the UE 402 is unconnected from the communication network of the TRP 401. In the unconnected state, the UE 402 is not connected to, or synchronized with, the communication network, has no active BWP (bandwidth part), and cannot transmit information to, or receive information from, the communication network using unicast transmission. Examples of the unconnected state include RRC Idle, RRC Inactive, and a discontinuation reception (DRX) state, e.g., in a long DRX cycle or an OFF duration of a DRX mode. A UE may be configured by a base station for mode to save power. In the DRX mode, the UE may be configured with periodic ON durations and OFF durations. The UE may monitor PDCCH during ON durations to identify if whether it will have downlink (DL)/uplink (UL) data. If the UE determines that it may have DL/UL data, the UE may stay awake for another amount of time, which may be defined based on an inactivity timer. If the UE identifies that it does not have DL/UL data, the UE may go to sleep and enter the OFF duration. During the OFF duration, the UE may skip monitoring for PDCCH, for example. The signal flow 400 is a four-step process using the Random Access Channel (RACH) for connecting the TRP 401 and the UE 402. Once connected, the UE 402 and the TRP 401 may exchange unicast messages. The signal flow 400 may be followed to transition from an unconnected state of the UE 402 (i.e., the UE 402 is outside of a connected state with the communication network, e.g., through and including the TRP 401) to a connected state. For example, the signal flow 400 may be followed when the UE 402 is powered up or wakes up from sleeping, or transitions from an RRC idle state or RRC inactive state (in either of which the UE 402 is unconnected) to an RRC connected state.

At stage 410 of the signal flow 400, the TRP 401 may transmit synchronization information in an SSB message and a SIB1 including synchronization information. The TRP 401 broadcasts the SSB and SIB1 messages. The UE 402 may receive the SSB and identifies the SIB1 message based on the SSB. The UE 402 may receive the SIB1 message from the TRP 401.

From the SIB1 message, the UE 402 determines one or more transmission properties of a RACH preamble sequence to be sent to the TRP 401 at stage 411 in a first message MSG1. The UE 402 may select a RACH preamble sequence and may determine a RACH occasion (RO) (e.g., which may occur periodically, e.g., every 10 ms, 20 ms, 40 ms, 80 ms, 160 ms) according to SSB-to-RO mapping for transmitting the RACH preamble. For example, the UE 402 may determine to send the RACH preamble at the next (in time) RACH occasion. The RO is the time/frequency opportunity for the UE 402 to transmit a RACH preamble. There may be different RACH preamble formats, and correspondingly different RO sizes. The RACH preamble sequence may be selected from a set of RACH preamble sequences. In some aspects, the preamble format may be one or more of: format 0, format 1, format 2, format 3, format A1, format A2, format A3, format B1, format B2, format B3, format B4, format C0, format C1, or the like. Each of the preamble formats may be associated with a different cyclic prefix (CP) and a different preamble sequence. A preamble format may be grouped into two categories: long preamble and short preamble. By way of example, a long preamble may last for more than 1 ms in the time domain and a short preamble may last for less than 1 ms in the time domain. For example, a long preamble may be based on a sequence length of L=839. A long preamble may include preamble format 0, format 1, format 2, and format 3. By way of example, an SCS associated with a long preamble may be 1.25 kHz or 5 kHz. A long preamble may be used for the FR1 frequency band. A long preamble with 1.25 kHz SCS may occupy, by way of example, 6 resource blocks in the frequency domain. A long preamble with 5 kHz may occupy, by way of example, 24 resource blocks in the frequency domain. A short preamble may include preamble format A1, format A2, format A3, format B1, format B2, format B3, format B4, format C0, format C1. In some aspects, a short preamble may be based on a sequence length of L=139. In some aspects, an SCS associated with a short preamble may be 15 kHz, 30 kHz, 60 kHz, 120 kHz, or the like. A short preamble may occupy, by way of example, 12 resource blocks in the frequency domain independent of a preamble numerology. In some aspects, a last part of each OFDM symbol in the short preamble may act as a CP for the next OFDM symbol. In some aspects, the length of a preamble OFDM symbol may equal the length of data OFDM symbols. In some aspects, multiple short preambles may be multiplexed in time within a single RO. A RACH preamble may be transmitted with an identifier, such as a random access RNTI (RA-RNTI). Due to reciprocity of antennas, the UE 402 may determine which receive (Rx) beam best received a synchronization signal (e.g., the SSB) and select the corresponding transmit (Tx) beam for transmitting the RACH preamble. If reciprocity is available at the TRP 401, then the UE 402 may transmit the MSG1 once, and otherwise may repeat the MSG1 message for each of the TRP Tx beams. The UE 402 may be configured to send the first message MSG1 using the PRACH (Physical RACH).

The TRP 401 may be configured to respond to the MSG1 message sent at stage 411 (also called step 1) by sending a response or second message MSG2 at stage 412 (also called step 2). The response message MSG2 may be a random access response (RAR) UL grant that the TRP 401 sends using the physical downlink shared channel (PDSCH) with a selected beam. The second message MSG2 acknowledges receipt of the first message MSG1 and may provide some collision avoidance information. Based on the messages MSG1, MSG2, the TRP 401 and the UE 402 may establish coarse beam alignment that may be used in stages 413, 414 discussed below.

The UE 402 may be configured to receive the response message MSG2 and response, at stage 413 (also called step 3), by sending a third message MSG3 using resources scheduled by the TRP 401. The TRP 401 is thus aware of where to detect the third message MSG3 and which TRP Rx beam should be used to detect the third message MSG3. The UE 402 may be configured to send the third message MSG3 using the physical uplink shared channel (PUSCH) using the same beam or a different beam than the UE 402 used to send the first message MSG1.

At stage 414 (also called step 4), the TRP 401 confirms receipt of the third message MSG3 by sending a fourth message MSG4 in the PDSCH using the TRP Tx beam determined in stage 413. At this point, the UE 402 may have identified synchronization between the TRP 401 and the UE 402, may have identified resources for transmit and receive, and may be connected to the communication network (through and including the TRP 401), i.e., is in a connected state (an RRC connected state).

Figure 4B:
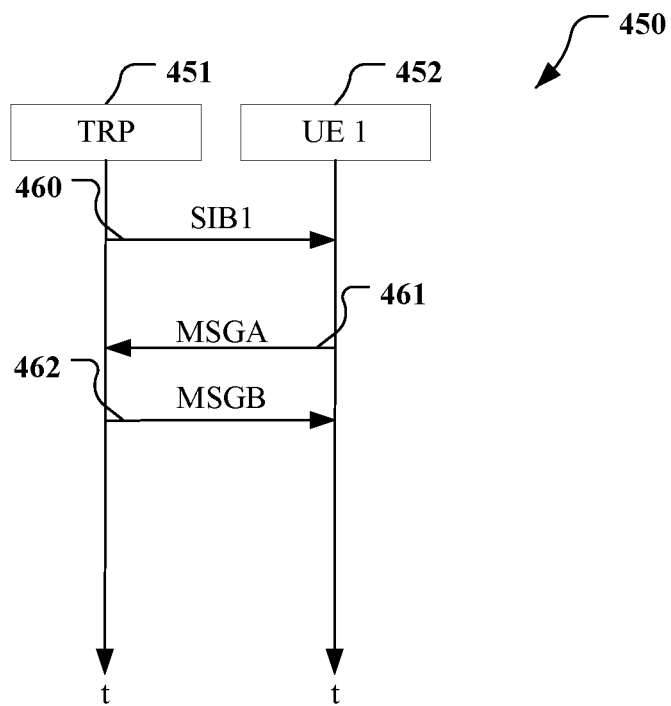

Referring also to FIG. 4B, a TRP 451 (e.g., of the base station 102/180) and a UE 452 (e.g., the UE 104) are configured to communicate with each other according to a signal flow 450 to establish RRC connection of the UE 452 to a communication network including the TRP 451. The signal flow 450 is a two-step process using the RACH for connecting the TRP 451 and the UE 452. The signal flow 450 is effectively a two-step version of the four-step signal flow 400 shown in FIG. 4A. At stage 460, the UE 452 receives the SSB and SIB1. At stage 461 (step 1 in the two-step process), the UE 452 sends an initial message MSGA after receipt of the SSB and SIB1. The initial message MSGA uses both PRACH and PUSCH. At stage 462 (step 2 in the two-step process), the TRP 451 sends a response message MSGB to the UE 452 to connect the UE 452 to the TRP 451.

Situations may arise when a UE is in an unconnected state relative to a communication network and configured to transmit SRS for positioning while performing the four-step or two-step PRACH process (e.g., illustrated in FIGS. 4A and 4B, respectively). Collision avoidance scenarios have been contemplated in which the UE is configured to transmit SRS for positioning in an unconnected state using the initial UL BWP. The initial UL BWP in this situation may include the BWP used to transmit PUSCH/PUCCH/SRS in the legacy scenarios. The initial DL BWP may include the BWP that is used to receive PDCCH for paging, etc., in DL. However, in cases where the UE is configured to transmit SRS for positioning in an unconnected state using a different BWP than the initial UL BWP, thereby specifying retuning, it is not clear what would qualify as a "collision," given the fact that a period of time is needed for retuning both before and after a transmission of an SRS occurrence. The BWP with which SRS is transmitted may be referred to herein as the SRS BWP.

Some aspects herein provide for establishing time gaps (or time windows) that identify collision and establish action times for dropping SRS transmission for collision avoidance in cases where the transmission of SRS during an unconnected state is configured outside the initial UL BWP. Some aspects can leverage established SRS switching times (e.g., an "SRS-SwitchingTimeNR" parameter or information element (IE)) in which a UE conducts a full RF re-tune by switching between receiving and/or sending messages in a bandwidth of first component carrier (CC) and transmitting SRS in a second CC. In some aspects, the SRS switching time may correspond to the UL BWP switching times, where BWP switch delay may be determined by slot length and UE capability (e.g., Type 1 or Type 2). For example, for slot lengths of 1, 0.5, 0.25, and 0.125 ms, BWP switch delay respectively may be 1, 2, 3, and 6 slots in length for a UE with Type 1 capabilities, and 3, 5, 8, and 18 for a UE with Type 2 capabilities.

Figure 5:
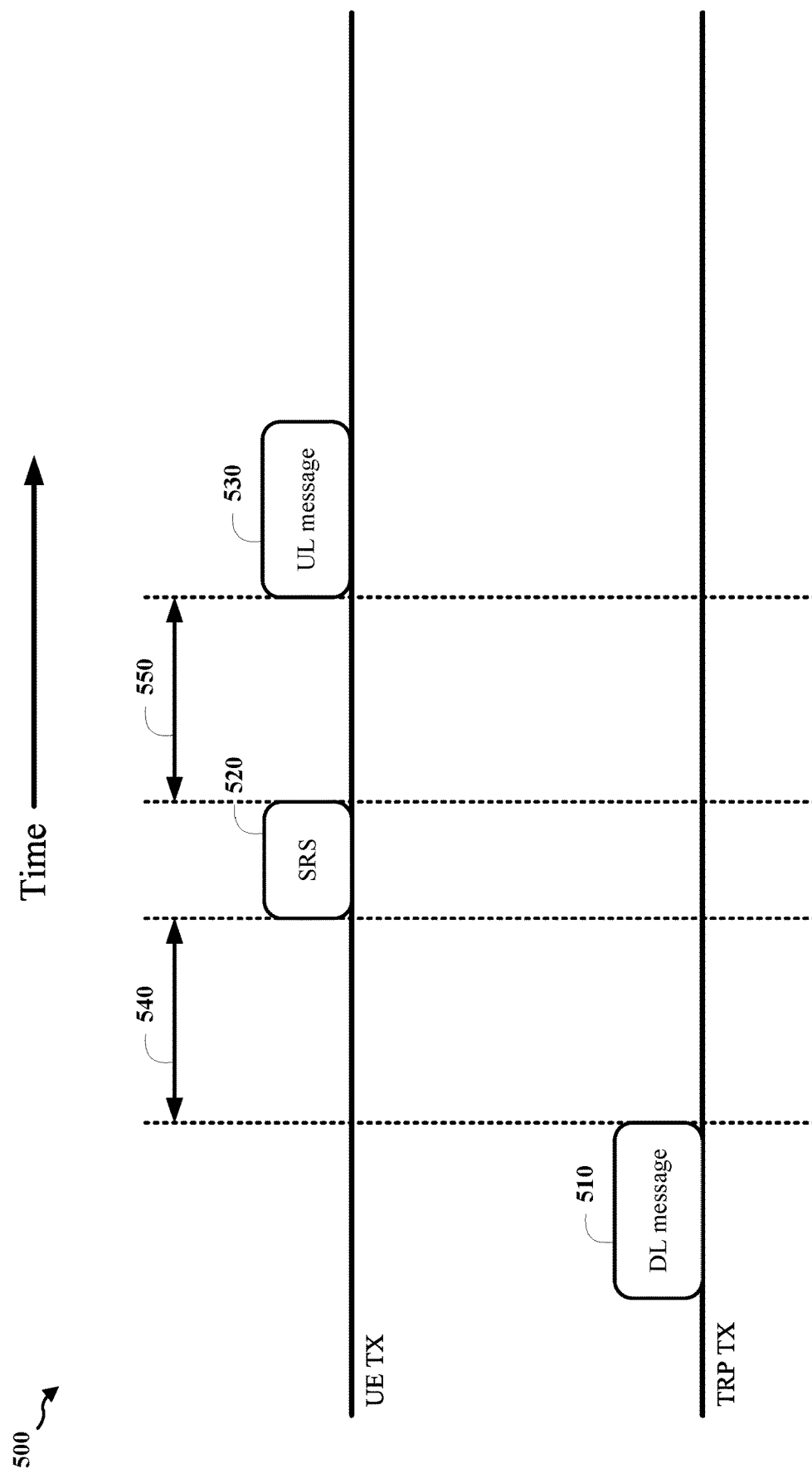
FIGS. 5 and 6 are timing diagrams illustrating examples of time gaps (buffer periods) between the transmission of SRS transmission and other messages.

FIG. 5 is a timing diagram 500 illustrating a generalized scenario in which a TRP transmits a DL message 510, followed by the UE transmitting an SRS instance 520 and a UL message 530. The DL message 510 and/or UL message 530 may be transmitted, for example, as part of a PRACH process (e.g., as illustrated in FIGS. 4 and 5) while the UE is operating in an unconnected state. Further, the SRS instance 520 may be transmitted in accordance with an SRS configuration, which may specify a particular SRS BWP, cyclic prefix (CP), and/or subcarrier spacing (SCS). As noted, the SRS BWP may be different than the initial UL BWP used by the UE to transmit messages as part of the PRACH process. A first time gap 540 includes a length of time between the DL message 510 and the SRS instance 520, and a second time gap 550 includes a length of time between the SRS instance 520 and the UL message 530.

Figure 6:
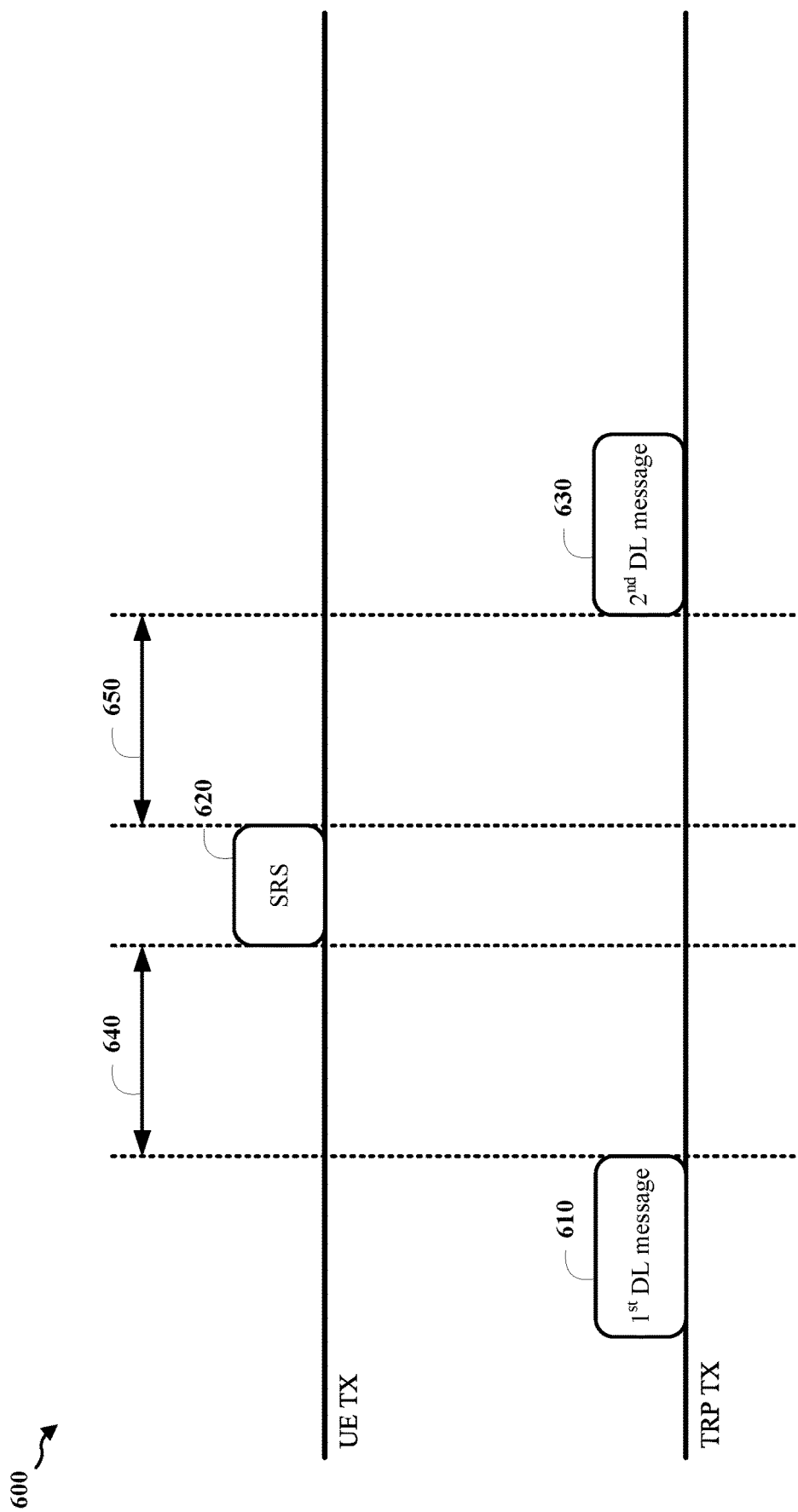

FIG. 6 is a timing diagram 600 similar to FIG. 5, in which the TRP transmits a first DL message 610 and the UE transmits an SRS instance 620. Here, however, the SRS instance 620 is followed by the TRP transmitting a second DL message 630. A first time gap 640 includes a length of time between the first DL message 610 and the SRS instance 620, and a second time gap 650 includes a length of time between the SRS instance 620 and the second DL message 630.

A timing conflict may arise between messages on either side of a time gap (e.g., 540, 550, 640, and 650) in cases where the time gap is shorter than a minimum time gap necessary to avoid conflict. In particular, minimum time gaps may be associated with RF tuning (if necessary) conducted by the UE to transmit an SRS instance (e.g., 520 or 620) or subsequent message (e.g., UL message 530 or second DL message 630). According to some aspects, in cases where the initial BWP (e.g., in which DL messages 510, 610, and 630 and UL message 530 are transmitted) has the same center frequency as the SRS BWP (with which SRS instances 520 and 620 are transmitted), a minimum time gap) may be relatively short: one OFDM symbol (the actual duration of which may vary, depending on the SCS used). In other aspects, the minimum time gap may be larger or smaller.

For example, in cases where the initial BWP and SRS BWP have a common center frequency, the minimum time gap may be one, two, three, or N symbols, where N is some number of symbols. According to some aspects, if a timing conflict occurs between a scheduled SRS instance and another message (e.g., a time gap between the SRS instance and the other message is shorter than a minimum time gap), then the SRS instance may be dropped. Further, according to some aspects, all subsequent SRS instances of an SRS configuration may be dropped.

In some aspects, a UE may drop in SRS instance if the SRS instance occurs in the same slot with a PRACH or is within N symbols of a PRACH. Put differently, for SRS transmission in RRC_INACTIVE state, a UE does not transmit SRS in a same slot with a PRACH or when a gap between the first or last symbol of a PRACH transmission in a first slot is separated by less than N symbols from the last or first symbol, respectively, of a SRS transmission in a second slot where $N=2$ for $\mu=0$ or $\mu=1$, $N=4$ for $\mu=2$ or $\mu=3$, and y is the SCS configuration of the initial UL BWP if SRS is associated with the initial UL BWP, or of the SRS configuration if a separate SCS is provided.

In aspects in which the SRS BWP used to transmit the SRS has a different center frequency than the initial BWP (e.g., a common center frequency is not possible), the minimum time gap between a DL message and SRS instance (e.g., time gaps 540, 640, and 650) may be relatively larger (e.g., larger than one OFDM symbol) because RF retuning may be specified by the UE. A similar minimum time gap due to similar retuning may be applied to a time gap (e.g., time gap 550) between an SRS instance using the SRS BWP and a UL message using an initial UL BWP (different than the SRS BWP). In such cases, the minimum time gap may be set as the SRS switching time (e.g., an SRS-SwitchingTimeNR parameter), which may be selected from a set of enumerated values. In some aspects, a DL SRS switching time (e.g., a switching time between an SRS instance and a DL message, such as time gaps 540, 640, and 650) may be set at a first value, and a UL SRS switching time (e.g., a switching time between an SRS instance and another UL message, such as time gap 550) may be set at a second value, which may be the same or different than the first value. According to some aspects, the SRS switching time (e.g., including the UL SRS switching time and/or DL SRS switching time) may be set at a certain time value, such as 0 μs, 30 μs, 100 μs, 140 μs, 200 μs, 300 μs, 500 μs, or 800 μs.

Figure 7:
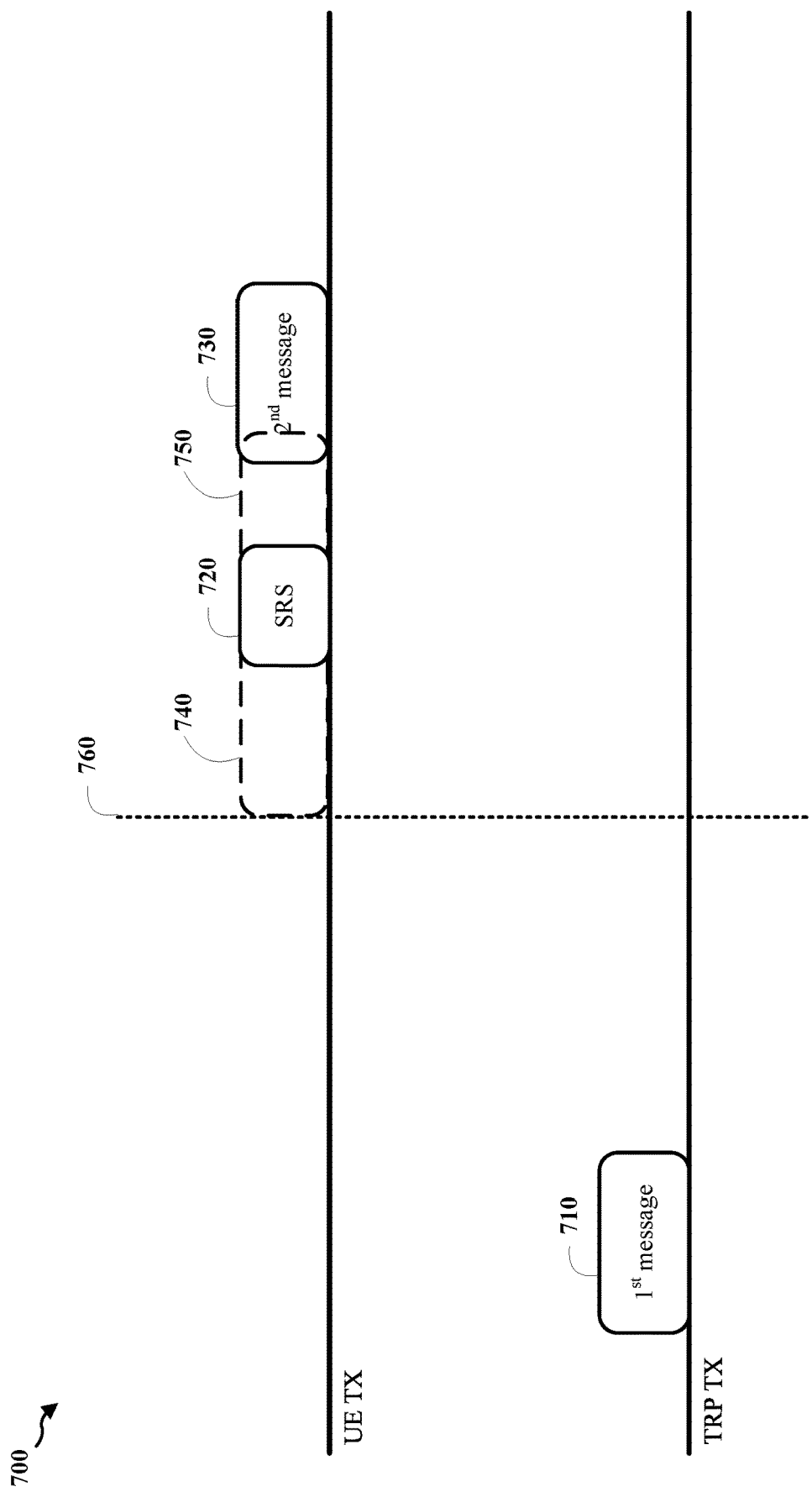
FIGS. 7 and 8 are timing diagrams illustrating examples of a timing conflict between SRS transmission and a subsequently-transmitted message.
Figure 8:
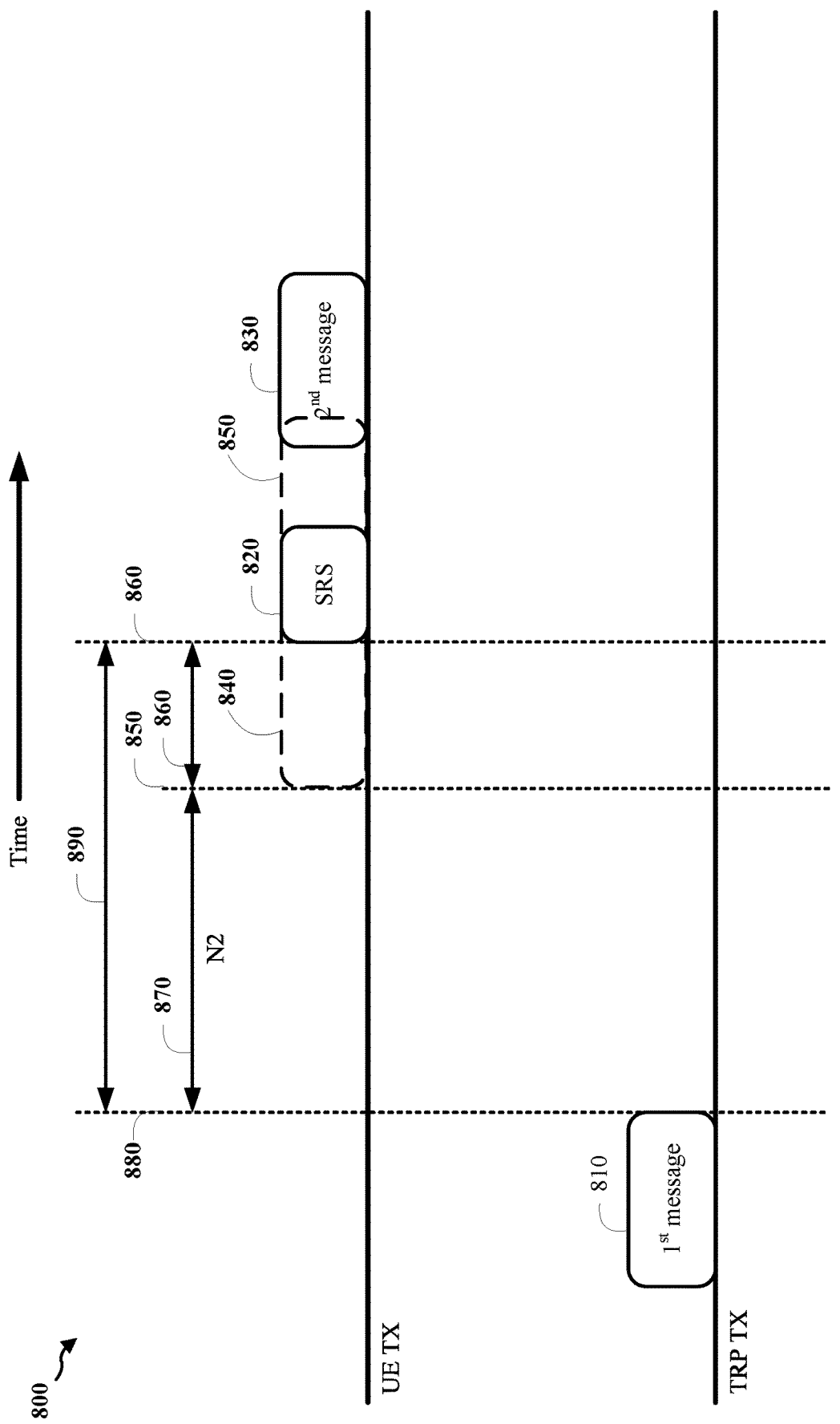

According to some aspects, action times may be established for SRS when collisions occur during an unconnected state of the UE. An action time is a time by which an upcoming collision may be identified to be resolved. In other words, if an upcoming collision is identified after the collision time, the collision may be unavoidable because a transmission (e.g., of an SRS instance) may already be pipelined. FIGS. 7 and 8 illustrate how action times for SRS may be determined in an unconnected state.

FIG. 7 is a timing diagram 700, similar to FIGS. 5 and 6, showing a scenario in which a UE may be scheduled to follow a transmission of a first message 710 by a TRP with the transmission of both an SRS instance 720 and a second message 730. Here, the first message 710 may correspond with any DL reception while the UE is in an unconnected state, such as SSB, SIB1, MSG2, or MSG4 of FIG. 4A, or SIB1 or MSGB of FIG. 4B; and second message 730 may correspond with a responsive UL message, such as MSG1 or MSG3, or MSGA of FIG. 5. Because the SRS BWP may be different than the initial DL BWP with which the UE receives the first message 710, the UE may use a first switching period 740 to perform RF tuning to be able to transmit the SRS instance 720 via the SRS BWP. Similarly, because the initial UL BWP with which the UE is to transmit the second message 730 may be different than the SRS BWP, the UE may use a second switching period 750 to be able to transmit the second message 730 via the initial UL BWP. As shown, the second switching period 750 extends into a time during which the second message 730 is to be transmitted, thereby resulting in a conflict. (A conflict may also occur when the second message 730 overlaps directly with the SRS instance 720 itself.) Because there may be a conflict between the SRS instance 720 and the second message 730, the UE may omit transmitting the SRS instance 720 (e.g., in accordance with the previously-described collision avoidance methods), and (optionally) all subsequent SRS instances in the SRS configuration. To ensure the UE successfully drops the transmission of the SRS instance 720, the UE may identify the collision at a point in time 760 prior to the beginning of the first switching period 740. FIG. 8 indicates how a specific action time may be determined.

FIG. 8 is a timing diagram 800 showing a conflict similar to FIG. 7, showing a scenario in which a UE is scheduled to follow a transmission of a first message 810 by a TRP with the transmission of both an SRS instance 820 and a second message 830, where the SRS instance 620 is preceded by a first switching period 840 and followed by a second switching duration 860. Point 850 marks the beginning of the first switching period 840, and indicates a point in time, according to some aspects, after which the transmission of the SRS instance 820 has already been pipelined and can no longer be canceled. Point 880, therefore, precedes the transmission of the SRS instance 820 by the switching duration 860 of the first switching period 840, and marks the time by which the UE may identify conflict between the transmission of the SRS instance 820 and the second message 830 (and cancel the transmission of the SRS instance 820). In many situations, (e.g., a PRACH process) the first message 810 may include Downlink Control Information (DCI) that schedules the transmission of the second message 830. Moreover, it takes a period of time (e.g., specified as N2) for the UE to decode the first message 810, denoted in FIG. 8 as decoding duration 870. Thus, the UE can avoid the conflict (e.g., by canceling the transmission of the SRS instance 820) if the first message 810 is received before the point 880, the action time, which precedes the transmission of the SRS instance 820 by a duration 890 including the sum of the decoding duration 870 and the switching duration 860. According to some aspects, duration 890 may be measured as the time interval between the last symbol of the first message 810 and the first symbol of the SRS instance 820.

More generally, for SRS transmissions by a UE in an unconnected state where the SRS transmissions use an SRS BWP with a different center frequency than the initial BWP with which a DL message is transmitted, aspects provided herein may use an action time by which the DL message scheduling a UL message is to be transmitted so that the UE can determine whether there is a conflict. The action time may be a time that precedes the transmission of an SRS instance by a time duration including the sum of (i) a time it takes for the UE to decode the DL message (e.g., an established N2 time period) and (ii) the SRS switching time preceding the transmission of the SRS instance. As noted, the SRS switching time may be a single symbol if the SRS BWP and initial BWP have the same center frequency. If the SRS BWP and initial BWP have different center frequencies, then longer switching times (e.g., a larger numbers of symbols) may be established. The use of this action time may apply, for example, in instances in which the DL message includes a Physical Downlink Control Channel (PDCCH) that schedules the UL message including a PUCCH, or where the DL message includes a PDSCH that schedules the UL message including a PUSCH.

This can be implemented as follows for two particular circumstances. First, for SRS in RRC_Inactive not associated with the UL BWP, the UE may apply the prioritization/dropping between the SRS and the msg3 transmission (e.g., as shown in FIG. 4A) taking into account DCI(s) for which the time interval between the last symbol of PDCCH and the first symbol of SRS is at least N2+SRSSwitchingTime. Second, for SRS in RRC_Inactive not associated with the UL BWP, the UE may apply the prioritization/dropping between the SRS and the PUCCH transmission taking into account DCI(s) for which the time interval between the last symbol of PDCCH and the first symbol of SRS is at least N2+SRSSwitchingTime.

In some wireless communication systems, some examples may be supported for SRS for positioning transmission by RRC inactive UEs. The first example may be that subject to UE capability, a UE may be configured with an SRS for positioning associated with the initial UL BWP and transmitted, during the RRC inactive state, inside the initial UL BWP with the same CP and SCS as configured for initial UL BWP. A second example may be that subject to UE capability, a UE may be configured with an SRS for Positioning where the following parameters are additionally configured for the transmission of the SRS for positioning during the RRC inactive state: a frequency location and bandwidth, an SCS, or a CP length. The UE may not transmit the SRS for positioning when it is expected to (e.g., scheduled to) perform UL transmissions in the initial UL BWP in RRC inactive state (which may be indicated as "RRC_INACTIVE"). In some aspects, SRS for positioning for UEs in RRC inactive state may be configured using the SRS-PosResourceSet information element (IE) (e.g., an IE for indicating SRS positioning resource set). Aspects provided herein may provide signaling for SRS for positioning configuration for RRC inactive UEs. In some aspects, the SRS-PosResourceSet IE may represent a higher layer parameter and may also include a slot level periodicity and slot level offset, which may be represented by IE periodicityAndOffset-p or IE periodicityAndOfset-sp. In some aspects, for an SRS for positioning configured using the SRS-PosResourceSet IE, a reference RS associated with the RS may be a DL positioning reference signal (PRS) configured on a serving cell, an SS/PBCH block, or a DL PRS of a non-serving cell indicated by a higher layer parameter.

Different types of BWP capabilities for connected state UEs may be provided. For example, BWP operation may be without restriction on BW of BWP(s). BW of UE-specific RRC configured BWP may not include BW of the CORESET #0 (if CORESET #0 is present) and SSB for primary cell (PCell) or primary secondary cell (PSCell) (if configured) and BW of the UE-specific RRC configured BWP may not include SSB for SCell. For Type A BWP adaptation with same numerology, a list of specifications may apply: 1) up to 2 UE-specific RRC configured DL BWPs per carrier, 2) up to 2 UE-specific RRC configured UL BWPs per carrier, 3) active BWP switching by downlink control information (DCI) and timer, 4) same numerology for all the UE-specific RRC configured BWPs per carrier, 5) BW of a UE-specific RRC configured BWP includes BW of the CORESET #0 (if CORESET #0 is present) and SSB for PCell/PSCell (if configured) and BW of the UE-specific RRC configured BWP includes SSB for SCell if there is SSB on SCell. For Type B BWP adaptation with same numerology, a list of specifications may apply: 1) up to 4 UE-specific RRC configured DL BWPs per carrier, 2) up to 4 UE-specific RRC configured UL BWPs per carrier, 3) active BWP switching by DCI and timer, 4) same numerology for all the UE-specific RRC configured BWPs per carrier, and 5) BW of a UE-specific RRC configured BWP includes BW of the CORESET #0 (if CORESET #0 is present) and SSB for PCell/PSCell (if configured) and BW of the UE-specific RRC configured BWP includes SSB for SCell if there is SSB on SCell. For BWP adaptation with different numerologies, a list of specifications may apply: 1) up to 4 UE-specific RRC configured DL BWPs per carrier, 2) up to 4 UE-specific RRC configured UL BWPs per carrier, 3) active BWP switching by DCI and timer, 4) more than one numerologies for the UE-specific RRC configured BWPs per carrier, 5) same numerology between DL and UL per cell except for SUL at a given time, and 6) BW of a UE-specific RRC configured BWP includes BW of the CORESET #0 (if CORESET #0 is present) and SSB for PCell/PSCell (if configured) and BW of the UE-specific RRC configured BWP includes SSB for SCell if there is SSB on SCell.

An example BWP information element (IE) may be provided below:

```
-- ASN1START
-- TAG-BWP-START
BWP ::=                SEQUENCE {
locationAndBandwidth       INTEGER (0...37949),
subcarrierSpacing          SubcarrierSpacing,
cyclicPrefix                              ENUMERATED { extended }
OPTIONAL -- Need R
}
-- TAG-BWP-STOP
-- ASN1STOP
```

A locationAndBandwidth parameter may indicate frequency domain location and bandwidth of this bandwidth part. The value of the field may be interpreted as resource indicator value (RIV). The first PRB may be a PRB determined by SCS (indicated by parameter subcarrierSpacing) of this BWP and an offset (indicated by offsetToCarrier parameter (may be configured in a SCS-SpecificCarrier parameter indicating the carrier contained within DL or UL frequency information such as FrequencyInfoDL/FrequencyInfoUL/FrequencyInfoUL-SIB/FrequencyInfoDL-SIB parameter within a serving cell configuration such as ServingCellConfigCommon/ServingCellConfigCommonSIB) corresponding to this subcarrier spacing. In case of TDD, a BWP-pair (UL BWP and DL BWP with the same bwp-Id) may have the same center frequency.

In some wireless communication systems, for UE in RRC INACTIVE state that can support DL PRS processing outside and inside of the initial DL BWP, for DL PRS processing outside of the initial DL BWP, the SCS, CP type of DL PRS may be the same or different as for the initial DL BWP. For DL PRS processing inside of the initial DL BWP, the SCS, CP type of DL PRS may be the same as for the initial DL BWP. This may have a potential impact of retuning time and expected relative timing difference (RSTD) assistance information on DL positioning reference signal (PRS) reception performance. UE capabilities may be defined for DL PRS processing in RRC_INACTIVE state.

Figure 9:
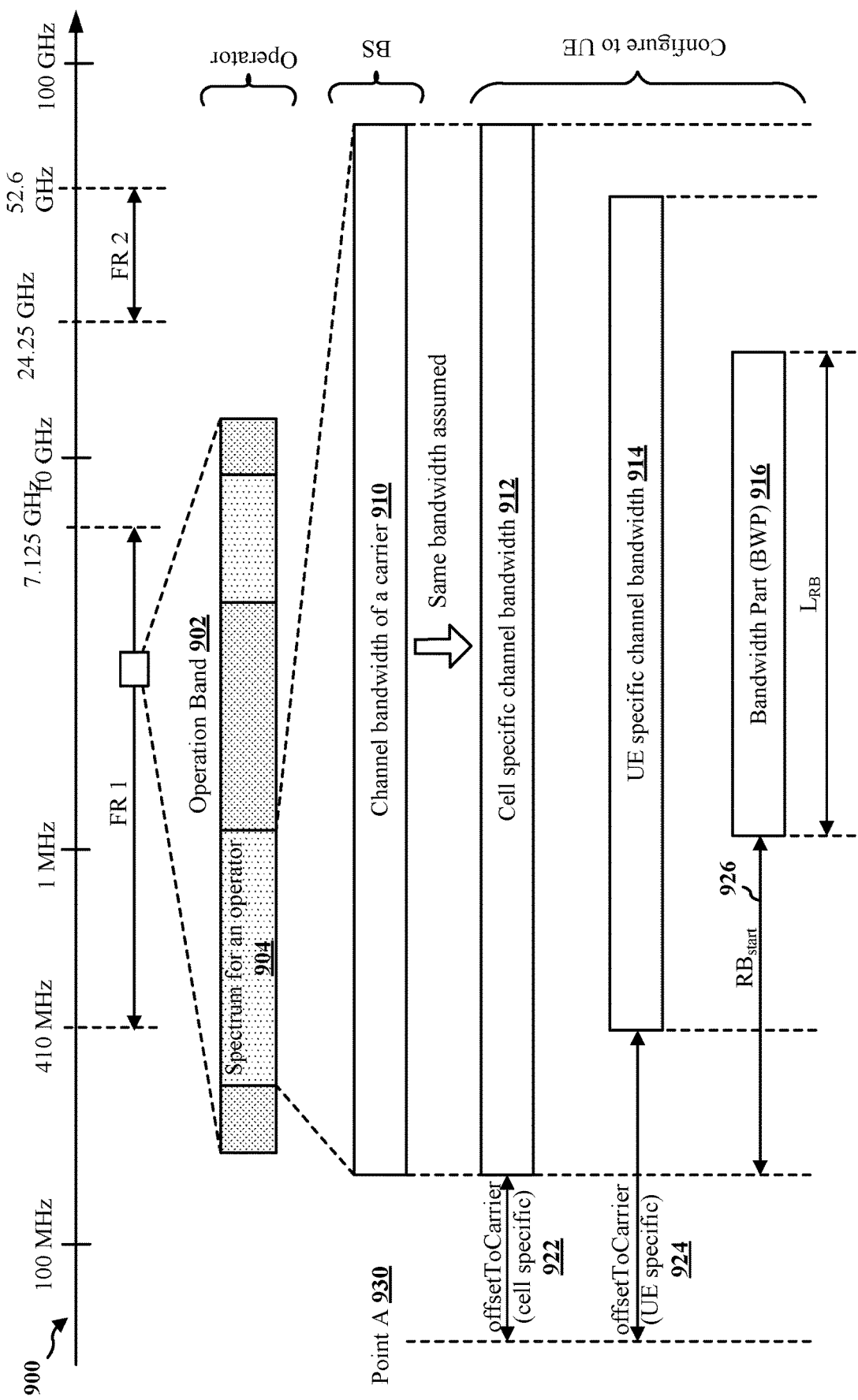
FIG. 9 is a diagram illustrating example spectrum management and configuration.

In some wireless communication systems, for spatial relation of SRS for positioning by RRC_INACTIVE UEs, validity criteria for pathloss measurement (OLPC) may be reused to determine validity of spatial relation for configured RS. If the UE determines that the UE is not able to meet the above validity criteria for spatial relation, the UE may stop transmission of SRS resource for positioning. The RS for spatial relation is a periodic or semi-persistent RS. FIG. 9 is a diagram 900 illustrating example spectrum management and configuration.

As illustrated in FIG. 9, within an operation band 902, there may be a spectrum 904 for an operator. Within the spectrum 904, a BWP 916 may start at a common RB and may include a set of contiguous RBs associated with a numerology (SCS and CP) on a carrier. The BWP 916 may be away from a start of a channel cell-specific channel bandwidth 912 by $RB_{start}$ 926. The carrier may be associated with a channel bandwidth 910. The channel bandwidth 910 may correspond with the cell-specific channel bandwidth 912. The cell-specific channel bandwidth 912 may occur after a number of RBs after a reference point 930 (Point A). In some aspects, the reference point 930 may be a common reference point for RB grids. In some aspects, the difference between the reference point 930 and the cell-specific channel bandwidth may be a cell specific offset to carrier 922. The network may configure a UE specific channel bandwidth 914 for a UE. The difference between the reference point 930 and the UE specific channel bandwidth 914 may be a UE specific offset to carrier 924. For each serving cell of the UE, the network may configure the UE with at least one UL BWP as initial DL BWP. The network may configure the UE with one or more DL BWPs, such as up to four DL BWPs. In some aspects, one DL BWP may be active at a time. For each serving cell of a UE, the network may configure the UE with at least one UL BWP as initial UL BWP. The network may configure the UE with one or more UL BWPs, such as up to four DL BWPs. In some aspects, one UL BWP may be active at a time. In some aspects, the UE may receive PDSCH, PDCCH, or CSI-RS inside the active DL BWP. The UE may perform radio resource management (RRM) measurements outside the active DL BWP via measurement gaps. The UE may transmit PUSCH or PUCCH inside the active UL BWP. For an active serving cell, the UE may not transmit SRS outside the active UL BWP.

Figure 10:
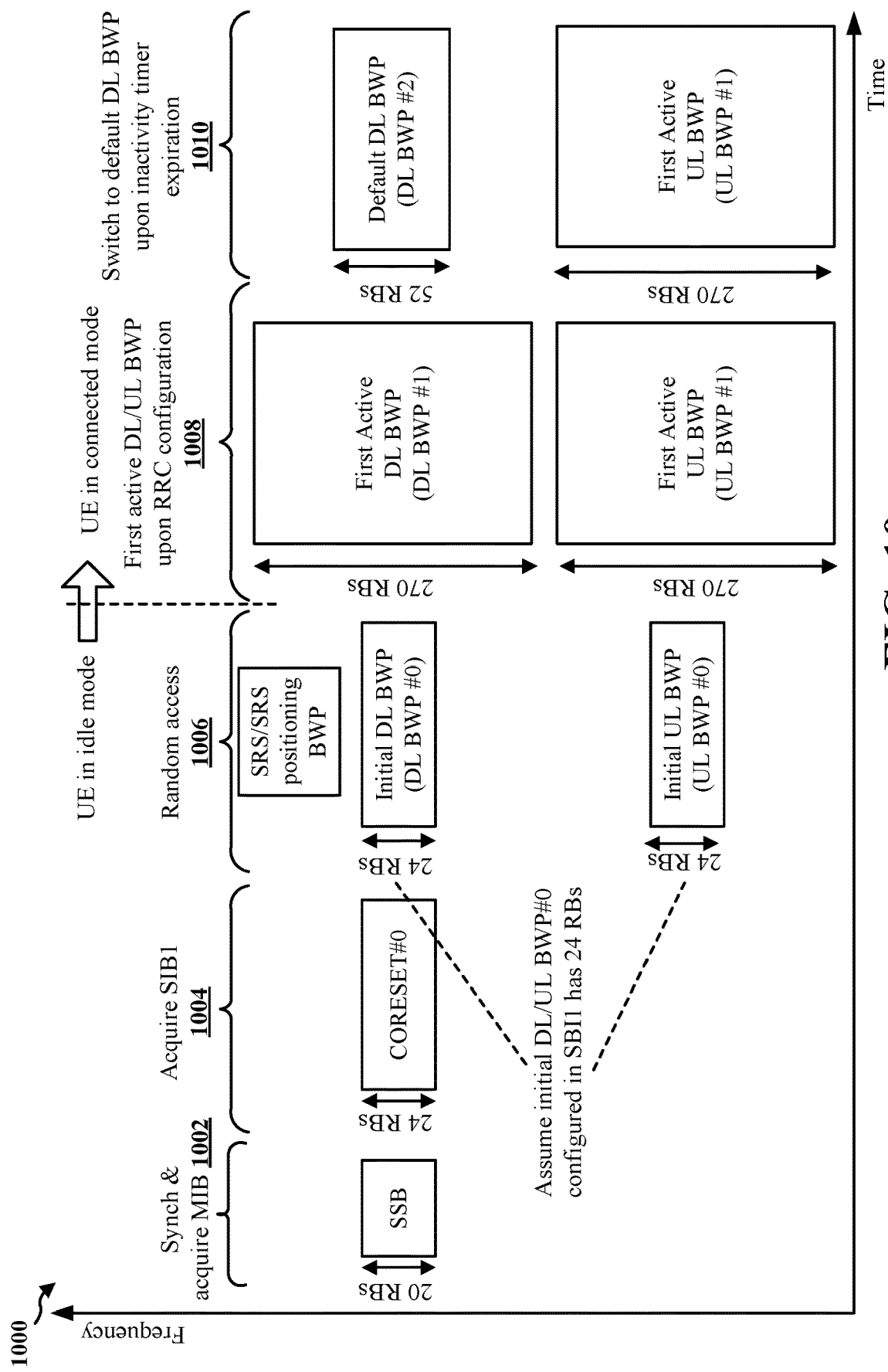
FIG. 10 is a diagram illustrating example resources including BWPs.

FIG. 10 is a diagram 1000 illustrating example resources including BWPs. BWP switch delay may be dependent on SCS. If the BWP switch happens between BWPs of different SCS values, the switch delay specification may be determined based on the smaller SCS. As illustrated in FIG. 10, a UE may synchronize and acquire MIB from a network at 1002. The UE may perform downlink synchronization and acquires PBCH at 1002. In some aspects, the initial DL and UL BWPs may be used at least for initial access before radio resource control (RRC) connection is established. An initial BWP has index zero and may be referred to referred to as BWP #0. During the initial access, a UE may perform cell search based on SSB including of PSS, SSS, and PBCH. To access the network, the UE may further acquire and read SIB1 at 1004 which carries information including the initial DL/UL BWP configuration. The SIB1 may be transmitted on the PDSCH, which may be scheduled by downlink control information (DCI) on the PDCCH using the control resource set with index zero (CORESET #0). Before the UE reads the SIB1, the UE's initial DL BWP may have the same frequency range and numerology as those of CORESET #0. After reading the SIB1, the UE may follow the initial DL/UL BWP configuration in the SIB1 and may use them to perform random-access procedure at 1006 to request the setup of RRC connection. The network may configure the frequency domain location and bandwidth of the initial DL BWP in the SIB1 so that the initial DL BWP includes the entire CORESET #0 in the frequency domain. The first active DL and UL BWPs 1008 may be configured for a Special Cell (SpCell) or a secondary cell (SCell). In a master cell group (MCG), the SpCell refers to the primary cell (PCell) in which the UE performs the connection (re-)establishment procedure. In a secondary cell group (SCG), the SpCell refers to the primary SCG cell (PSCell) in which the UE performs random access for RRC (re-)configuration. An SCell provides additional radio resources on top of an SpCell in a cell group. The first active DL and UL BWPs are the active DL and UL BWPs upon RRC (re-)configuration for an SpCell or activation of an SCell. For a serving cell, the network may configure the UE with a BWP inactivity timer. The expiration of this timer may, for example, indicate that the UE has no scheduled transmission and reception for a while on the currently active BWP. Thus, the UE can switch its active BWP to a default BWP to save power. The default DL BWP can be configured. If not configured, the UE uses the initial DL BWP as the default DL BWP. For unpaired spectrum, when the UE switches its active DL BWP to the default DL BWP, the active UL BWP is switched accordingly since the BWP switching for TDD may be common for both DL and UL.

In other words, The UE may perform downlink synchronization and acquires PBCH based on 20-RB SSB at 1002. Assuming the CORESET #0 configured in the MIB has 24 RBs, the UE may assume that the initial DL BWP is 24 RBs wide and may proceed to acquire SIB1 at 1004, which may also configure 24 RBs for both initial DL and UL BWPs. The UE may perform random-access procedure at 1006 with the initial DL and UL BWPs. After the random access, the UE may report that it is capable of supporting multiple BWPs. With dedicated RRC signaling, the network may configure the UE with first active DL/UL BWP 1008 (270 RBs each), small DL/UL BWP #2 (52 RBs), and BWP inactivity timer. The first active DL/UL BWP 1008 may become activated and used for scheduling a large amount of data. After that, the UE may not have traffic demand and may have no scheduled transmission. As a result, the BWP inactivity timer may expire, upon which the UE switches its active DL BWP to the default DL BWP at 1010 (e.g., DL BWP #2). In some aspects, if the BWP switch (e.g., from initial to first active or upon expiration of timer) happens between BWPs of different SCS values, the switch delay specification may be determined based on the smaller SCS.

Figure 11:
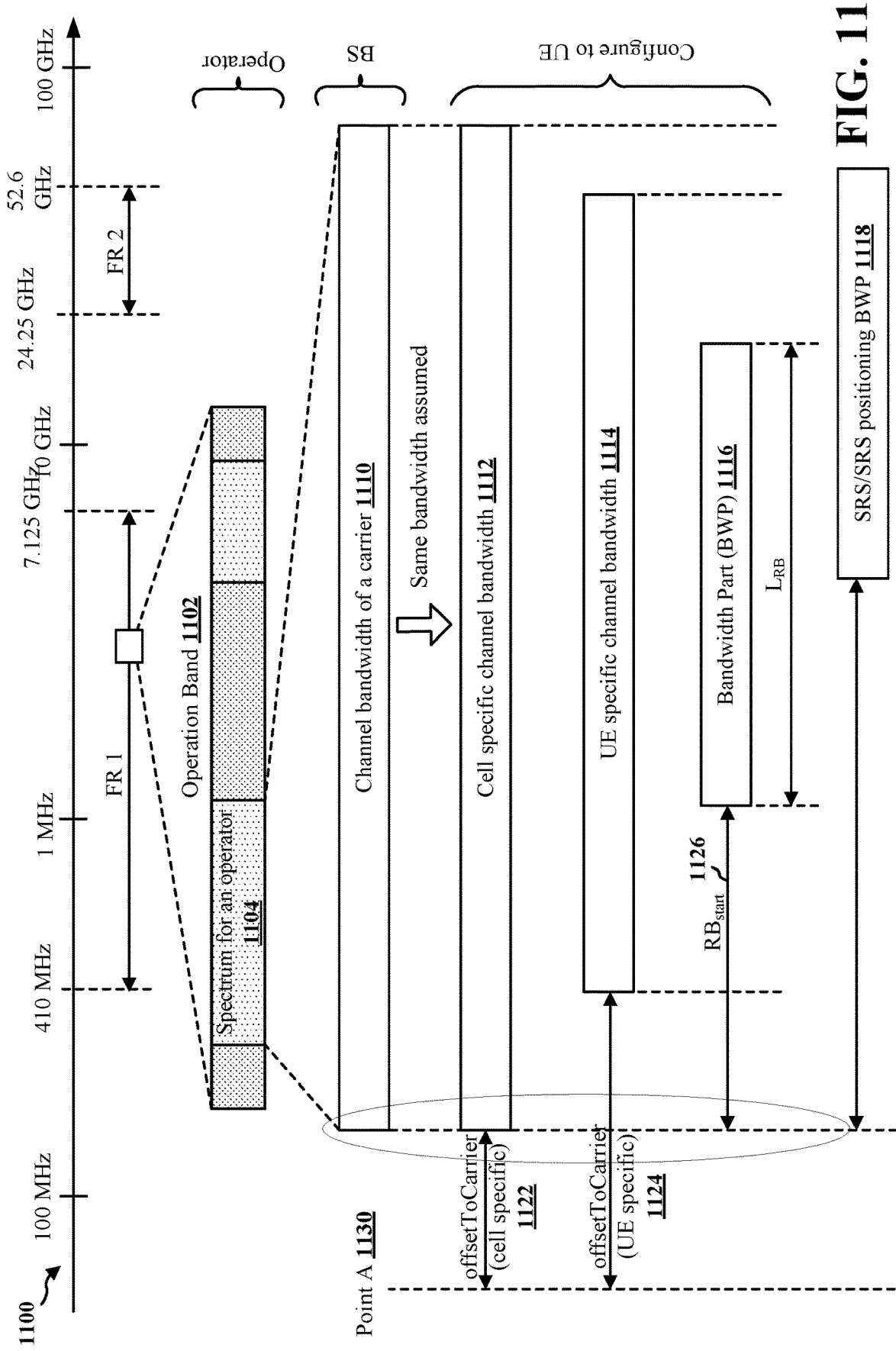
FIG. 11 is a diagram illustrating example spectrum management and configuration with SRS for positioning.

FIG. 11 is a diagram 1100 illustrating example spectrum management and configuration with SRS for positioning. As illustrated in FIG. 11, within an operation band 1102, there may be a spectrum 1104 for an operator. Within the spectrum 1104. A BWP 1116 may start at a common RB and may include a set of contiguous RBs associated with a numerology (SCS and CP) on a carrier. The BWP 1116 may be away from a start of a channel cell-specific channel bandwidth 1112 by $RB_{start}$ 1126. The carrier may be associated with a channel bandwidth 1110. The channel bandwidth 1110 may correspond with the cell-specific channel bandwidth 1112. The cell-specific channel bandwidth 1112 may occur after a number of RBs after a reference point 1130 (Point A). In some aspects, the reference point 1130 may be a common reference point for RB grids. In some aspects, the difference between the reference point 1130 and the cell specific channel bandwidth may be a cell specific offset to carrier 1122. The network may configure a UE specific channel bandwidth 1114 for a UE. The difference between the reference point 1130 and the UE specific channel bandwidth 1114 may be a UE specific offset to carrier 1124. For each serving cell of the UE, the network may configure the UE with at least one UL BWP as initial DL BWP. The network may configure the UE with one or more DL BWPs, such as up to four DL BWPs. In some aspects, one DL BWP may be active at a time. For each serving cell of a UE, the network may configure the UE with at least one UL BWP as initial UL BWP. The network may configure the UE with one or more UL BWPs, such as up to four DL BWPs. In some aspects, one UL BWP may be active at a time. In some aspects, the UE may receive PDSCH, PDCCH, or CSI-RS inside the active DL BWP. The UE may perform radio resource management (RRM) measurements outside the active DL BWP via measurement gaps. The UE may transmit PUSCH or PUCCH inside the active UL BWP. For an active serving cell, the UE may not transmit SRS outside the active UL BWP. In some aspects, an SRS for positioning (which may be otherwise referred to as special SCS or SRS-POS-only) and/or associated BWP 1118 (may be defined BWP or hypothetical BWP and may be referred to as "SRS-POS-only BWP" may have a location and bandwidth, SCS, CP, defined the same way as another BWP, such as an initial or non-initial BWP not for positioning (e.g., BWP 1116). The SRS and/or associated BWP for positioning may inherit the another BWP's restrictions. For example, a same OffsetToCarrier (e.g., UE specific offset to carrier 1124) configured in SRS-SpecificCarrier may be used for the SRS for positioning and/or associated BWP (e.g., SRS-POS-only BWP/Special-SRS) and any regular BWP (initial/non-initial). This may be a stronger constraint than the SRS may be in the same band as the initial BWP. In some aspects, the SRS-POS-only BWP and the initial BWP may be specified to be in the same carrier (e.g., associated with the channel bandwidth 1110). In some aspects, in TDD, the SRS for positioning and/or associated BWP (e.g., SRS-POS-only BWP/Special-SRS) 1118 may correspond with the UL BWP. In some aspects, center frequency of the initial DL BWP and the SRS and/or associated BWP (e.g., SRS-POS-only BWP/Special-SRS) may be different. In some aspects, in TDD, DL BWP and the paired UL BWP may have a different center frequency.

In some aspects, based on other signaled UE capabilities, the UE may support at least one connected mode configuration where the SRS for positioning and/or associated BWP (e.g., SRS-POS-only BWP/Special-SRS) may be the active BWP and switching between the active BWP and the initial BWP may be supported. In some aspects, as long as the UE supports in RRC connected a retuning between an initial BWP and any other non-initial BWP, the UE may be able to do the retuning between the initial BWP and the SRS-POS-only BWP in RRC inactive with similar timing uncertainty.

Figure 13:
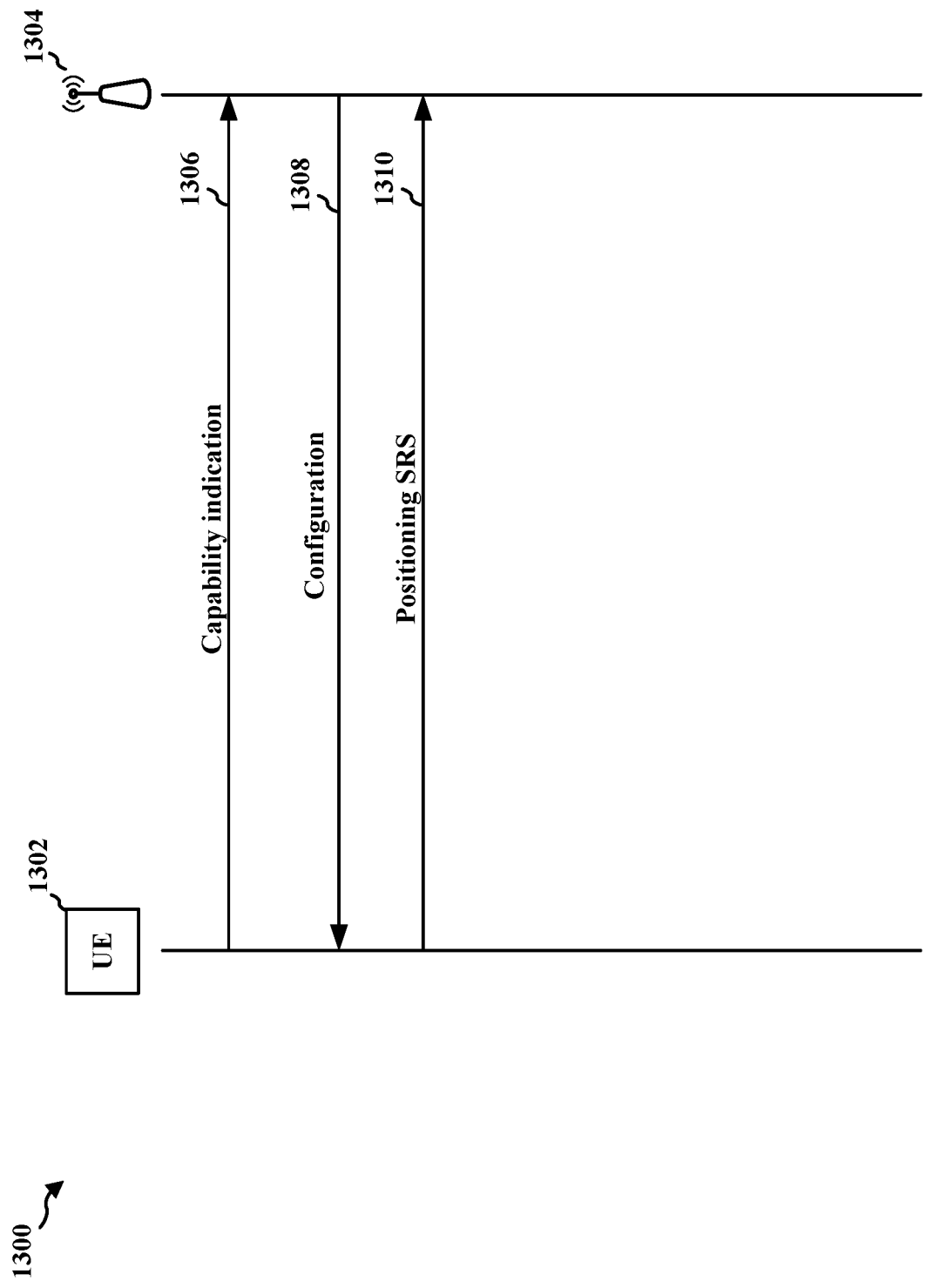
FIG. 13 is a diagram illustrating communications between a UE and a network entity.

In some aspects, referring to diagram 1300 of FIG. 13, the UE may transmit a UE capability (e.g., in a capability indication 1306) that may further indicate that the UE 1302 supports same SCS/CP (which may be part of numerology) without supporting different SCS/CP between SRS for positioning and/or associated BWP (e.g., SRS-POS-only BWP/Special-SRS) and initial BWP (e.g., similar to previously described Type A/B BWP adaptation with same numerology and BWP adaptation with different numerologies). The capability may be transmitted to the network entity 1304. In some aspects, the network entity 1304 may be a network node. In some aspects, the network node may be implemented as an aggregated base station, a disaggregated base station, an integrated access and backhaul (IAB) node, a relay node, a sidelink node, or the like. In some aspects, the network entity 1304 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, if the UE 1302 declares support of same SCS/CP between all BWPs and declares support of SRS for positioning and/or associated BWP (e.g., SRS-POS-only BWP/Special-SRS) without declaring other support in a transmitted UE capability, then the SRS for positioning and/or associated BWP (e.g., SRS-POS-only BWP/Special-SRS) may have a same SCS/CP as the initial BWP. In some aspects, a separate component may be supported for the SRS for positioning and/or associated BWP (e.g., SRS-POS-only BWP/Special-SRS), which may in turn support a separate SCS/CP.

Figure 12:
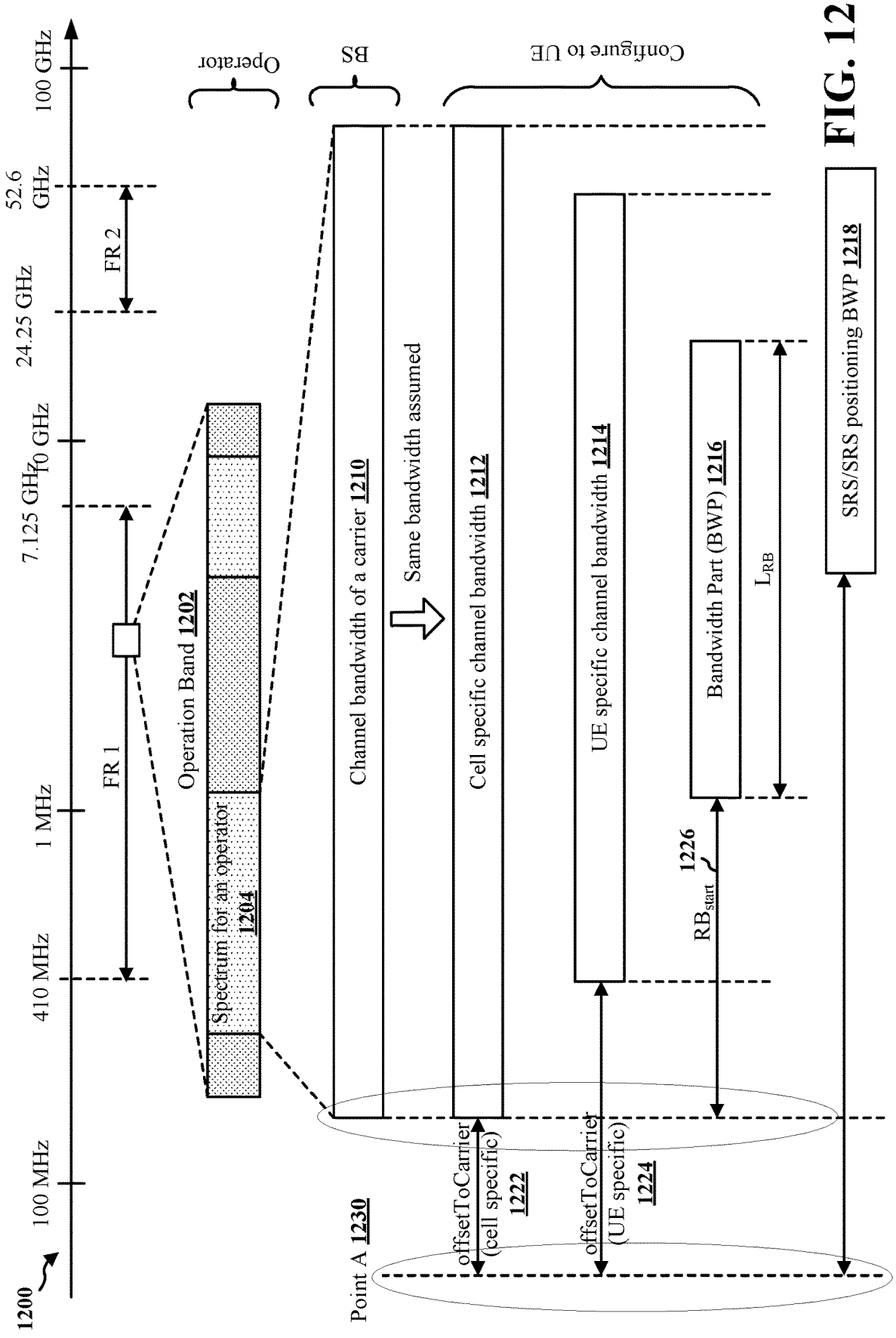
FIG. 12 is a diagram illustrating example spectrum management and configuration with SRS for positioning.

In some aspects, the UE 1302 may transmit a UE capability (e.g., in the capability indication 1306) that may further indicate that SRS for positioning and/or associated BWP (e.g., SRS-POS-only BWP/Special-SRS) without restriction may be supported or not (such as BWP without SSB/Coreset0). For example, similar to previously described BWP operation without restriction on BW of BWP(s) which may support BW of UE-specific RRC configured BWP may not include BW of the CORESET #0 (if CORESET #0 is present) and SSB for PCell/PSCell (if configured) and BW of the UE-specific RRC configured BWP may not include SSB for SCell. In some aspects, the SRS for positioning and/or associated BWP (e.g., SRS-POS-only BWP/Special-SRS) may be on the same band as that of the initial BWP. FIG. 12 is a diagram 1200 illustrating example spectrum management and configuration with SRS for positioning. As illustrated in FIG. 12, within an operation band 1202, there may be a spectrum 1204 for an operator. Within the spectrum 1204. A BWP 1216 may start at a common RB and may include a set of contiguous RBs associated with a numerology (SCS and CP) on a carrier. The BWP 1216 may be away from a start of a channel cell-specific channel bandwidth 1212 by $RB_{start}$ 1226. The carrier may be associated with a channel bandwidth 1210. The channel bandwidth 1210 may correspond with the cell-specific channel bandwidth 1212. The cell-specific channel bandwidth 1212 may occur after a number of RBs after a reference point 1230 (Point A). In some aspects, the reference point 1230 may be a common reference point for RB grids. In some aspects, the difference between the reference point 1230 and the cell specific channel bandwidth may be a cell specific offset to carrier 1222. The network may configure a UE specific channel bandwidth 1214 for a UE. The difference between the reference point 1230 and the UE specific channel bandwidth 1214 may be a UE specific offset to carrier 1224. For each serving cell of the UE, the network may configure the UE with at least one UL BWP as initial DL BWP. The network may configure the UE with one or more DL BWPs, such as up to four DL BWPs. In some aspects, one DL BWP may be active at a time. For each serving cell of a UE, the network may configure the UE with at least one UL BWP as initial UL BWP. The network may configure the UE with one or more UL BWPs, such as up to four DL BWPs. In some aspects, one UL BWP may be active at a time. In some aspects, the UE may receive PDSCH, PDCCH, or CSI-RS inside the active DL BWP. The UE may perform radio resource management (RRM) measurements outside the active DL BWP via measurement gaps. The UE may transmit PUSCH or PUCCH inside the active UL BWP. For an active serving cell, the UE may not transmit SRS outside the active UL BWP. The SRS for positioning and/or associated BWP (e.g., SRS-POS-only BWP/Special-SRS) 1218 may be on the same band as the initial BWP (e.g., 1216).

In some aspects, the SRS for positioning and/or associated BWP (e.g., SRS-POS-only BWP/Special-SRS) may be such that, based on other signaled UE capabilities, the UE may support at least one connected mode configuration where the SRS-only BWP is the active BWP and the UE may operate with no switching gap between that active BWP and the initial BWP. In some aspects, the UE may operate with a switching gap. In some aspects, the UE may report per band, for the SRS outside initial BWP, the supported SRS BW, CP, SCSs.

In some aspects, the UE 1302 may report (e.g., capabilities in the capability indication 1306) in a per-band-pair or per-group of bands basis, e.g., which band/group of band may be used for SRS outside initial BWP for a given band/group of band that contains the initial BWP. In some aspects, the UE may report a capability whether the SRS outside initial BWP may be in the same band as the initial BWP but in a different component carrier (e.g., OffsetTo-Carrier may be different for such an SRS compared to the OffsetToCarrier of the initial BWP).

In some aspects, the UE 1302 may report capability (e.g., in the capability indication 1306) whether the same center frequency is expected in TDD between the initial DL BWP and the SRS outside initial UL BWP.

In some aspects, the UE 1302 may receive a configuration 1308 for the transmission of one or more positioning SRS outside of an initial UL BWP during the idle state or the inactive state. In some aspects, the configuration 1308 may include a set of constraints on the transmission of the one or more positioning SRS from the network entity 1304. In some aspects, the set of constraints may be based on or not based on the capability indication 1306. In some aspects, the configuration 1308 may be received after the capability indication 1306 is transmitted. In some aspects, based on the configuration 1308, the UE 1302 may transmit one or more positioning SRS 1310 to the network entity 1304.

Figure 14:
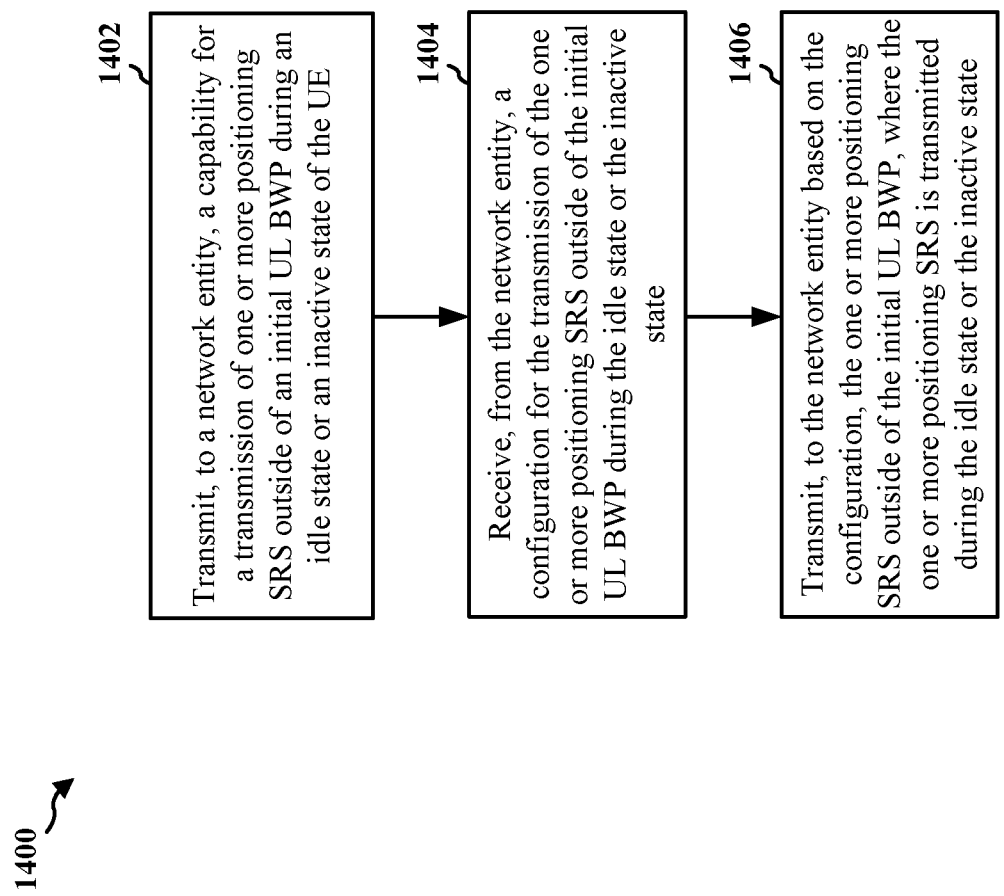
FIG. 14 is a flowchart of a method of wireless communication.

FIG. 14 is a flowchart 1400 of a method of wireless communication. The method may be performed by a UE (e.g., the UE 104; the apparatus 1602).

At 1402, the UE may transmit, to a network entity, a capability for a transmission of one or more positioning SRS outside of an initial UL BWP during an idle state or an inactive state of the UE. For example, the UE 104 or the UE 1302 may transmit, to a network entity (e.g., 1304), a capability (e.g., 1306) for a transmission of one or more positioning SRS outside of an initial UL BWP during an idle state or an inactive state of the UE. In some aspects, 1302 may be performed by SRS component 1642 in FIG. 16. In some aspects, the capability may include that the UE supports at least one connected mode configuration where a BWP associated with the one or more positioning SRS may be an active BWP and the UE supports switching between the BWP associated with the one or more positioning SRS and the initial UL BWP. In some aspects, the capability may include that the UE supports retuning associated with switching between the initial UL BWP and a non-initial BWP and the UE supports retuning associated with switching between the initial UL BWP and the BWP associated with the one or more positioning SRS. In some aspects, the capability may include that the UE supports a same SCS and CP between the initial UL BWP and a BWP associated with the one or more positioning SRS without supporting different SCS or CP between the initial UL BWP and the BWP associated with the one or more positioning SRS. In some aspects, the capability may include whether the UE supports the one or more positioning SRS having a bandwidth which does not include an SSB or CORESET 0. In some aspects, a BWP associated with the one or more positioning SRS may be in a same frequency band with the initial UL BWP.

In some aspects, the capability may include whether the BWP associated with the one or more positioning SRS may be in a different carrier as the initial UL BWP. In some aspects, the capability may include that the UE supports switching between a BWP associated with the one or more positioning SRS and the initial UL BWP with or without a switching gap. In some aspects, the capability of supporting SRS transmission outside of the initial BWP may be reported on a per-band basis, where the capability may include at least one supported SCS, at least one supported CP, or at least one supported SRS BW. In some aspects, the capability may include whether a same center frequency may be associated with an initial BWP and the one or more positioning SRS. In some aspects, the network entity may be a TRP or a base station.

At 1404, the UE may receive, from the network entity, a configuration for the transmission of the one or more positioning SRS outside of the initial UL BWP during the idle state or the inactive state, where the configuration includes a set of constraints on the transmission of the one or more positioning SRS. For example, the UE 104 or the UE 1302 may receive, from the network entity (e.g., 1304), a configuration (e.g., 1308) for the transmission of the one or more positioning SRS outside of the initial UL BWP during the idle state or the inactive state, where the configuration includes a set of constraints on the transmission of the one or more positioning SRS. In some aspects, 1404 may be performed by SRS component 1642 in FIG. 16. In some aspects, the set of constraints may include a first constraint that a BWP associated with the one or more positioning SRS or the configuration of the one or more positioning SRS is associated with at least one of a location and bandwidth parameter, a SCS, or a CP based on the initial UL BWP. In some aspects, the set of constraints may include a second constraint that an offset to a carrier configuration of the initial UL BWP is the same as the offset to a carrier used for the BWP associated with the one or more positioning SRS or the configuration of the one or more positioning SRS. In some aspects, the BWP associated with the one or more positioning SRS may be paired with an initial DL BWP.

At 1406, the UE may transmit, to the network entity based on the configuration, the one or more positioning SRS outside of the initial UL BWP, where the one or more positioning SRS is transmitted during the idle state or the inactive state. For example, the UE 104 or the UE 1302 may transmit, to the network entity based on the configuration, the one or more positioning SRS (e.g., 1310) outside of the initial UL BWP, where the one or more positioning SRS is transmitted during the idle state or the inactive state. In some aspects, 1406 may be performed by SRS component 1642 in FIG. 16.

Figure 15:
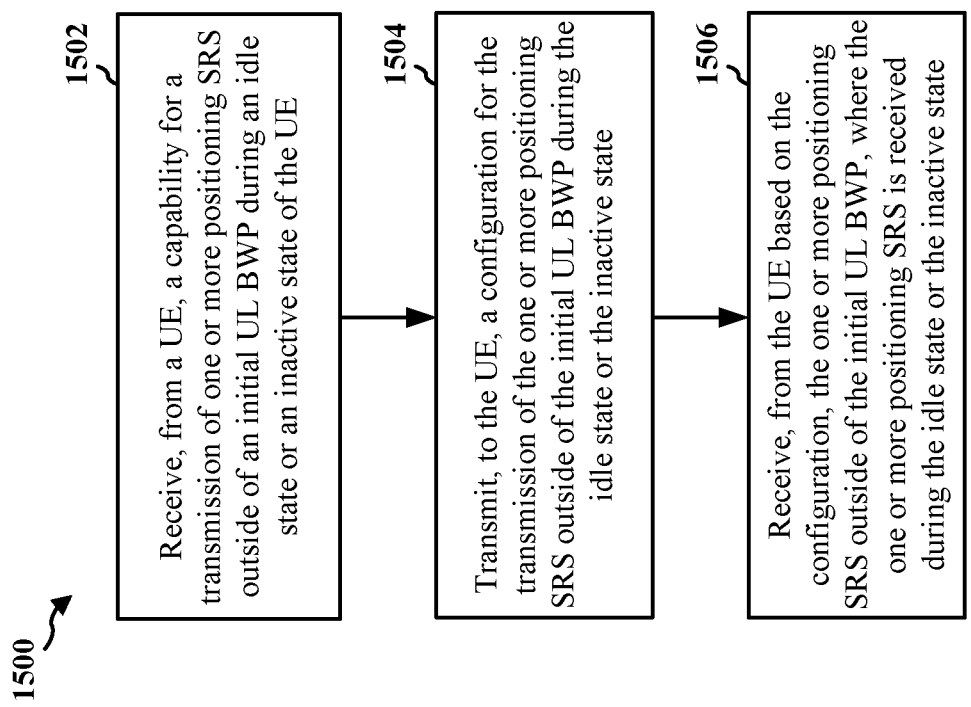
FIG. 15 is a flowchart of a method of wireless communication.

FIG. 15 is a flowchart 1500 of a method of wireless communication. The method may be performed by a network entity (e.g., the base station 102/180, the network entity 1304; the apparatus 1702).

Figure 17:
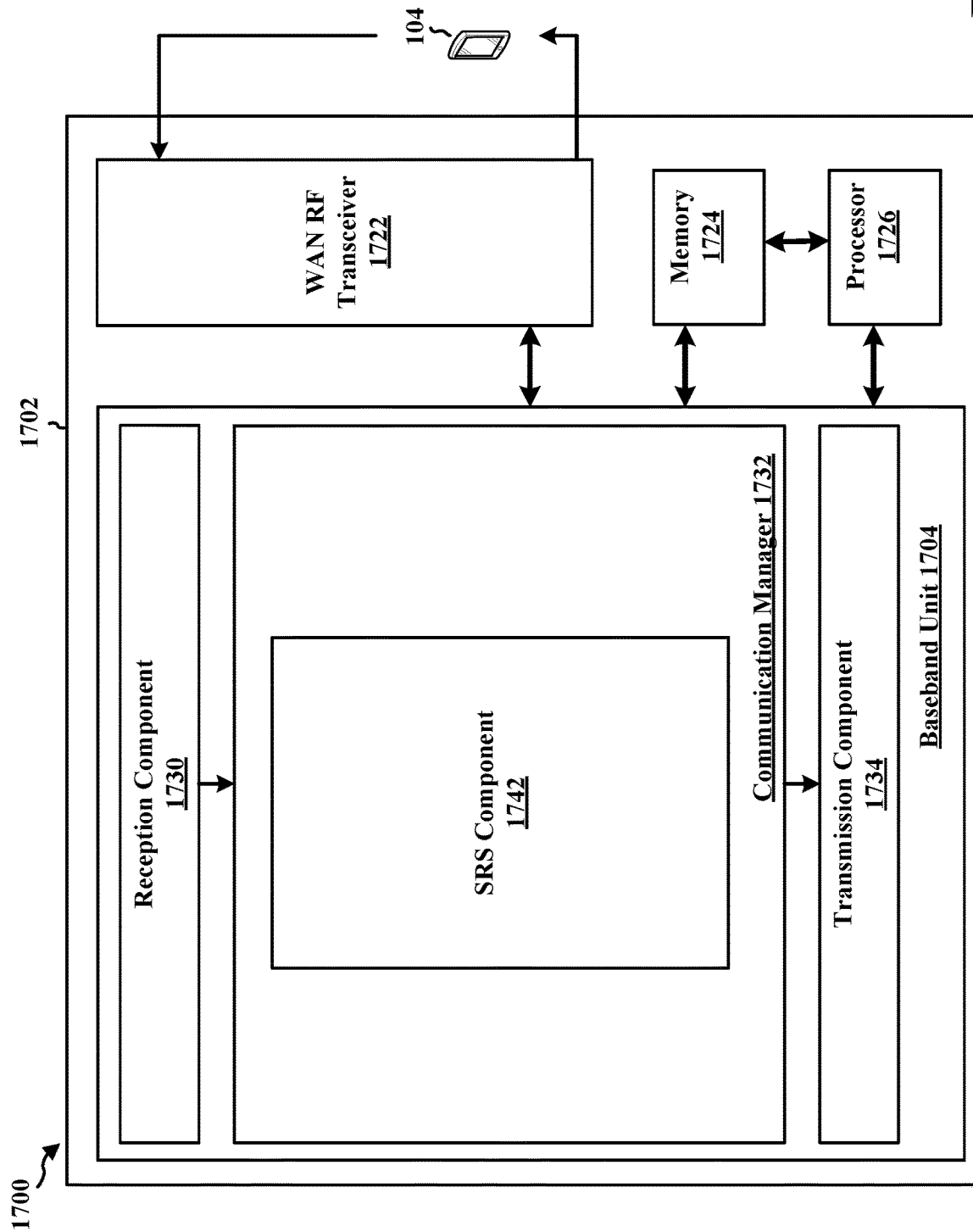
FIG. 17 is a diagram illustrating an example of a hardware implementation for an example apparatus.

At 1502, the network entity may receive, from a UE, a capability for a transmission of one or more positioning SRS outside of an initial UL BWP during an idle state or an inactive state of the UE. For example, the base station 102/180 or the network entity 1304 may receive, from a UE (e.g., 1302), a capability (e.g., 1306) for a transmission of one or more positioning SRS outside of an initial UL BWP during an idle state or an inactive state of the UE. In some aspects, 1502 may be performed by SRS component 1742 in FIG. 17. In some aspects, the capability may include that the UE supports at least one connected mode configuration where a BWP associated with the one or more positioning SRS may be an active BWP and the UE supports switching between the BWP associated with the one or more positioning SRS and the initial UL BWP. In some aspects, the capability may include that the UE supports retuning associated with switching between the initial UL BWP and a non-initial BWP and the UE supports retuning associated with switching between the initial UL BWP and the BWP associated with the one or more positioning SRS. In some aspects, the capability may include that the UE supports a same SCS and CP between the initial UL BWP and a BWP associated with the one or more positioning SRS without supporting different SCS or CP between the initial UL BWP and the BWP associated with the one or more positioning SRS. In some aspects, the capability may include whether the UE supports the one or more positioning SRS having a bandwidth which does not include an SSB or CORESET 0. In some aspects, a BWP associated with the one or more positioning SRS may be in a same frequency band with the initial UL BWP. In some aspects, the capability may include whether the BWP associated with the one or more positioning SRS may be in a different carrier as the initial UL BWP. In some aspects, the capability may include that the UE supports switching between a BWP associated with the one or more positioning SRS and the initial UL BWP with or without a switching gap. In some aspects, the capability of supporting SRS transmission outside of the initial BWP may be reported on a per-band basis, where the capability may include at least one supported SCS, at least one supported CP, or at least one supported SRS BW. In some aspects, the capability may include whether a same center frequency may be associated with an initial BWP and the one or more positioning SRS. In some aspects, the network entity may be a TRP or a base station.

At 1504, the network entity may transmit a configuration (e.g., 1308) for the transmission of the one or more positioning SRS outside of the initial UL BWP during the idle state or the inactive state, where the configuration may include a set of constraints on the transmission of the one or more positioning SRS. For example, the base station 102/180 or the network entity 1304 may transmit a configuration for the transmission of the one or more positioning SRS outside of the initial UL BWP during the idle state or the inactive state, where the configuration may include a set of constraints on the transmission of the one or more positioning SRS. In some aspects, 1504 may be performed by SRS component 1742 in FIG. 17. In some aspects, the set of constraints may include a first constraint that a BWP associated with the one or more positioning SRS or the configuration of the one or more positioning SRS is associated with at least one of a location and bandwidth parameter, a SCS, or a CP based on the initial UL BWP. In some aspects, the set of constraints may include a second constraint that an offset to a carrier configuration of the initial UL BWP is the same as the offset to a carrier used for the BWP associated with the one or more positioning SRS or the configuration of the one or more positioning SRS. In some aspects, the BWP associated with the one or more positioning SRS may be paired with an initial DL BWP.

At 1506, the network entity may receive, from the UE based on the configuration, the one or more positioning SRS outside of the initial UL BWP, where the one or more positioning SRS may be received during the idle state or the inactive state. For example, the base station 102/180 or the network entity 1304 may receive, from the UE (e.g., 1302) based on the configuration, the one or more positioning SRS (e.g., 1310) outside of the initial UL BWP, where the one or more positioning SRS may be received during the idle state or the inactive state. In some aspects, 1506 may be performed by SRS component 1742 in FIG. 17.

Figure 16:
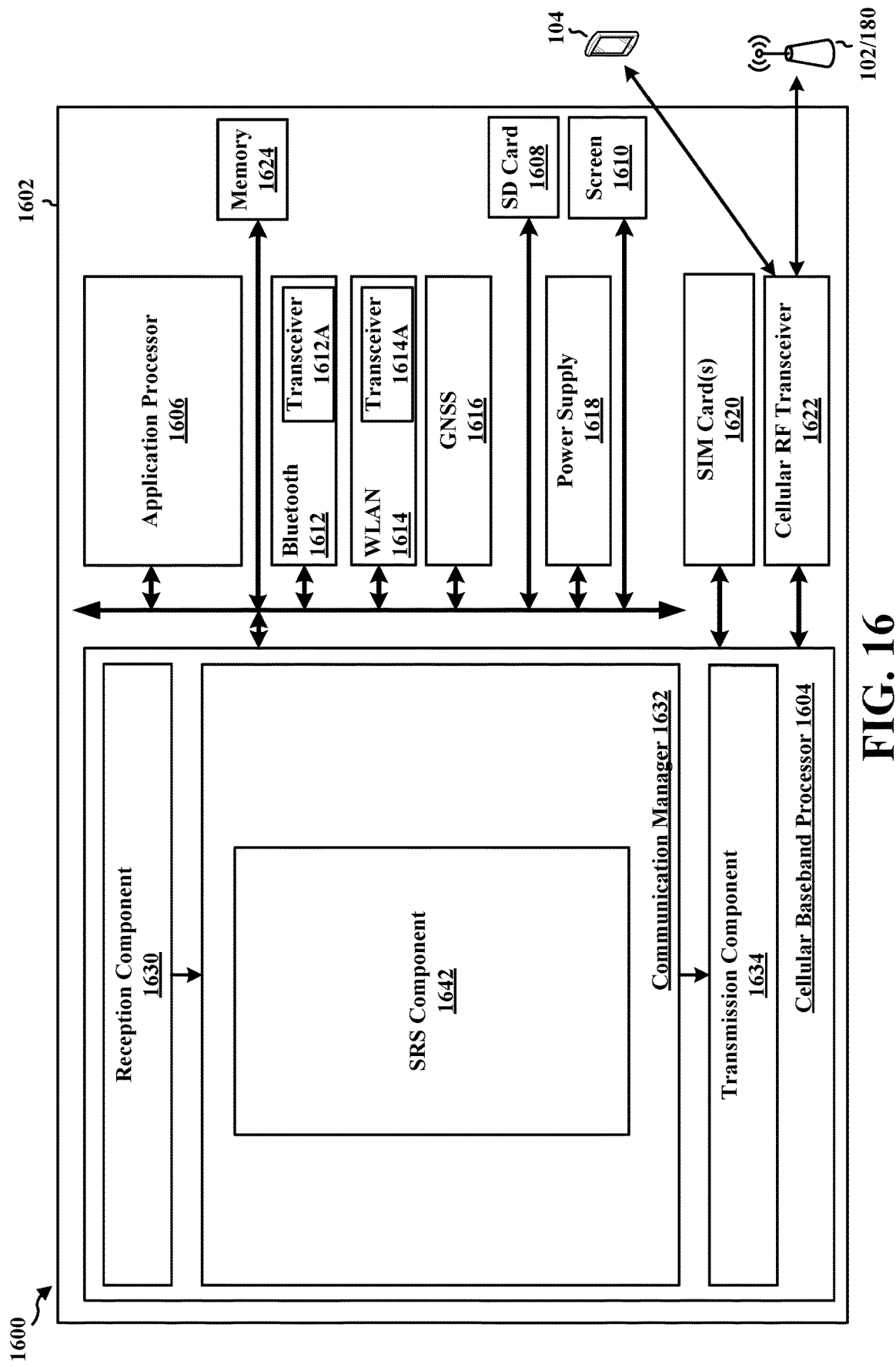
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606, a secure digital (SD) card 1608 and a screen 1610, a Bluetooth module 1612, a wireless local area network (WLAN) module 1614, a Global Navigation Satellite System (GNSS) module 1616, a power supply 1618, or a memory 1624. The Bluetooth module 1612 may include a transceiver 1612A and the WLAN module 1614 may include a transceiver 1614A. The GNSS module 1616 may include a GNSS receiver. In some aspects, the power supply 1618 may include a battery. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 may include an SRS component 1642 that is configured to transmit, to a network entity, a capability for a transmission of one or more positioning SRS outside of an initial UL BWP during an idle state or an inactive state of the UE, e.g., as described in connection with 1402 in FIG. 14. The SRS component 1642 may be further configured to receive, from the network entity, a configuration for the transmission of the one or more positioning SRS outside of the initial UL BWP during the idle state or the inactive state, e.g., as described in connection with 1404 in FIG. 14. The SRS component 1642 may be further configured to transmit, to the network entity based on the configuration, the one or more positioning SRS outside of the initial UL BWP, e.g., as described in connection with 1406 in FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, may include means for transmitting, to a network entity, a capability for a transmission of one or more positioning SRS outside of an initial UL BWP during an idle state or an inactive state of the UE. The cellular baseband processor 1604 may further include means for receiving, from the network entity, a configuration for the transmission of the one or more positioning SRS outside of the initial UL BWP during the idle state or the inactive state, where the configuration includes a set of constraints on the transmission of the one or more positioning SRS. The cellular baseband processor 1604 may further include means for transmitting, to the network entity based on the configuration, the one or more positioning SRS outside of the initial UL BWP, where the one or more positioning SRS is transmitted during the idle state or the inactive state. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 16 is a diagram 1700 illustrating an example of a hardware implementation for an apparatus 1702. The apparatus 1702 may be a network entity, such as a base station, a component of a base station, or may implement base station functionality. In some aspects, the apparatus 1702 may include a baseband unit 1704. The baseband unit 1704 may communicate through a wide area network (WAN) RF transceiver 1722 with the UE 104. The WAN RF transceiver 1722 may support various air interfaces and may support wireless communication using one or more RATs, such as GSM, CDMA, WCDMA, LTE, High Rate Packet Data (HRPD), IEEE 802.11 WiFi (also referred to as Wi-Fi), BT, Worldwide Interoperability for Microwave Access (WiMAX), 5G NR, or the like. The apparatus 1702 may further include a memory 1724 and a processor 1726 coupled to the memory 1724. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 may include an SRS component 1742 that may receive, from a UE, a capability for a transmission of one or more positioning SRS outside of an initial UL BWP during an idle state or an inactive state of the UE, e.g., as described in connection with 1602 in FIG. 15. The SRS component 1742 may also transmit a configuration for the transmission of the one or more positioning SRS outside of the initial UL BWP during the idle state or the inactive state, where the configuration includes a set of constraints on the transmission of the one or more positioning SRS, e.g., as described in connection with 1604 in FIG. 15. The SRS component 1742 may also receive, from the UE based on the configuration, the one or more positioning SRS outside of the initial UL BWP, where the one or more positioning SRS is received during the idle state or the inactive state, e.g., as described in connection with 1606 in FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, may include means for receiving, from a UE, a capability for a transmission of one or more positioning SRS outside of an initial UL BWP during an idle state or an inactive state of the UE. The baseband unit 1704 may further include means for transmitting a configuration for the transmission of the one or more positioning SRS outside of the initial UL BWP during the idle state or the inactive state, where the configuration includes a set of constraints on the transmission of the one or more positioning SRS. The baseband unit 1704 may further include means for receiving, from the UE based on the configuration, the one or more positioning SRS outside of the initial UL BWP, where the one or more positioning SRS is received during the idle state or the inactive state. The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for wireless communication at a UE, including: memory; transmitting, to a network entity, a capability for a transmission of one or more positioning SRS outside of an initial UL BWP during an idle state or an inactive state of the UE; receiving, from the network entity, a configuration for the transmission of the one or more positioning SRS outside of the initial UL BWP during the idle state or the inactive state, where the configuration includes a set of constraints on the transmission of the one or more positioning SRS; and transmitting, to the network entity based on the configuration, the one or more positioning SRS outside of the initial UL BWP, where the one or more positioning SRS is transmitted during the idle state or the inactive state.

Aspect 2 is the method of aspect 1, where the set of constraints includes a first constraint that a BWP associated with the one or more positioning SRS or the configuration of the one or more positioning SRS is associated with at least one of a location and bandwidth parameter, a SCS, or a CP based on the initial UL BWP.

Aspect 3 is the method of any of aspects 1-2, where the set of constraints includes a second constraint that an offset to a carrier configuration of the initial UL BWP is the same as the offset to a carrier used for the BWP associated with the one or more positioning SRS or the configuration of the one or more positioning SRS.

Aspect 4 is the method of aspect 2, where the BWP associated with the one or more positioning SRS is paired with an initial DL BWP.

Aspect 5 is the method of any of aspects 1-4, where the capability includes that the UE supports at least one connected mode configuration where a BWP associated with the one or more positioning SRS is an active BWP and the UE supports switching between the BWP associated with the one or more positioning SRS and the initial UL BWP.

Aspect 6 is the method of any of aspects 1-5, where the capability further includes that the UE supports switching between the initial UL BWP and the BWP associated with the one or more positioning SRS.

Aspect 7 is the method of any of aspects 1, where the capability further includes that the UE supports a same SCS and CP between the initial UL BWP and a BWP associated with the one or more positioning SRS without supporting different SCS or CP between the initial UL BWP and the BWP associated with the one or more positioning SRS.

Aspect 8 is the method of any of aspects 1-7, where the capability further includes whether the UE supports the one or more positioning SRS having a bandwidth which does not include a SSB or CORESET 0.

Aspect 9 is the method of any of aspects 1-8, where a BWP associated with the one or more positioning SRS is in a same frequency band with the initial UL BWP.

Aspect 10 is the method of any of aspects 1-9, where the capability further includes whether the BWP associated with the one or more positioning SRS is in a different carrier as the initial UL BWP.

Aspect 11 is the method of any of aspects 1-10, where the capability further includes that the UE supports switching between a BWP associated with the one or more positioning SRS and the initial UL BWP with or without a switching gap.

Aspect 12 is the method of any of aspects 1-11, where the capability of supporting SRS transmission outside of the initial BWP is reported on a per-band basis, where the capability includes at least one supported SCS, at least one supported CP, or at least one supported SRS BW.

Aspect 13 is the method of any of aspects 1-12, where the capability further includes whether a same center frequency is associated with an initial BWP and the one or more positioning SRS.

Aspect 14 is the method of any of aspects 1-13, where the network entity is a TRP or a base station.

Aspect 15 is a method for wireless communication at a network entity, including: receiving, from a UE, a capability for a transmission of one or more positioning SRS outside of an initial UL BWP during an idle state or an inactive state of the UE; transmitting a configuration for the transmission of the one or more positioning SRS outside of the initial UL BWP during the idle state or the inactive state, where the configuration includes a set of constraints on the transmission of the one or more positioning SRS; and receiving, from the UE based on the configuration, the one or more positioning SRS outside of the initial UL BWP, where the one or more positioning SRS is received during the idle state or the inactive state.

Aspect 16 is the method of aspect 15, where the set of constraints includes a first constraint that a BWP associated with the one or more positioning SRS is associated with at least one of a location and bandwidth parameter, a SCS, or a CP based on the initial UL BWP.

Aspect 17 is the method of any of aspects 15-16, where the set of constraints includes a second constraint that an offset to a carrier associated with the initial UL BWP is used for the BWP associated with the one or more positioning SRS.

Aspect 18 is the method of any of aspects 15-17, where the BWP associated with the one or more positioning SRS corresponds to the initial UL BWP.

Aspect 19 is the method of any of aspects 15-18, where the capability includes that the UE supports at least one connected mode configuration where a BWP associated with the one or more positioning SRS is an active BWP and the UE supports switching between the BWP associated with the one or more positioning SRS and the initial UL BWP.

Aspect 20 is the method of any of aspects 15-19, where the capability further includes that the UE supports switching between the initial UL BWP and the BWP associated with the one or more positioning SRS.

Aspect 21 is the method of any of aspects 15-20, where the capability further includes that the UE supports a same SCS and CP between the initial UL BWP and a BWP associated with the one or more positioning SRS without supporting different SCS or CP between the initial UL BWP and the BWP associated with the one or more positioning SRS.

Aspect 22 is the method of any of aspects 15-21, where the capability further includes whether the UE supports the one or more positioning SRS without a SSB or CORESET 0.

Aspect 23 is the method of any of aspects 15-22, where a BWP associated with the one or more positioning SRS is in a same band with the initial UL BWP.

Aspect 24 is the method of aspect 15-23, where the BWP associated with the one or more positioning SRS is in a different carrier with the initial UL BWP.

Aspect 25 is the method of any of aspects 15-24, where the capability further includes that the UE supports switching between a BWP associated with the one or more positioning SRS and the initial UL BWP with or without a switching gap.

Aspect 26 is the method of any of aspects 15-25, where the capability is associated with a band for SRS outside of the initial BWP, and the band includes at least one supported SCS, at least one supported CP, or at least one supported SRS BW.

Aspect 27 is the method of any of aspects 15-26, where the capability further includes whether a same center frequency is associated with an initial BWP and the one or more positioning SRS.

Aspect 28 is the method of any of aspects 15-27, where the network entity is a TRP or a base station.

Aspect 29 is an apparatus for wireless communication at a UE including a memory and at least one processor coupled to the memory and, based at least in part on information stored in the memory, configured to perform a method in accordance with any of aspects 1-14. The apparatus may include at least one of a transceiver or an antenna coupled to the at least one processor.

Aspect 30 is an apparatus for wireless communication, including means for performing a method in accordance with any of aspects 1-14.

Aspect 31 is a non-transitory computer-readable medium including instructions that, when executed by an apparatus, cause the apparatus to perform a method in accordance with any of aspects 1-14.

Aspect 32 is an apparatus for wireless communication at a network entity including a memory and at least one processor coupled to the memory and, based at least in part on information stored in the memory, configured to perform a method in accordance with any of aspects 15-28. The apparatus may include at least one of a transceiver or an antenna coupled to the at least one processor.

Aspect 33 is an apparatus for wireless communication, including means for performing a method in accordance with any of aspects 15-28.

Aspect 34 is a non-transitory computer-readable medium including instructions that, when executed by an apparatus, cause the apparatus to perform a method in accordance with any of aspects 15-28.

What is claimed is:

1. An apparatus for wireless communication at a user equipment (UE), comprising:
   memory;
   a transceiver; and
   at least one processor communicatively connected to the memory and the transceiver, the at least one processor configured to:
      transmit, to a network entity, one or more capabilities for a transmission of one or more positioning sounding reference signals (SRS) outside of an initial uplink (UL) bandwidth part (BWP) during an idle state or an inactive state of the UE, wherein the one or more capabilities comprises at least one of:
         whether the UE supports the one or more positioning SRS outside of the initial UL BWP that can have a bandwidth which does not include a synchronization signal block (SSB) or control resource set 0 (CORESET 0),
         whether the UE supports different center frequency between the one or more positioning SRS outside of the initial UL BWP and the initial UL BWP,
         or any combination thereof;
      receive, from the network entity a configuration, based at least in part on the one or more capabilities, for the transmission of the one or more positioning SRS outside of the initial UL BWP during the idle state or the inactive state, wherein the configuration includes a set of constraints on the transmission of the one or more positioning SRS, and wherein the set of constraints includes a first constraint that a BWP associated with the one or more positioning SRS or the configuration of the one or more positioning SRS is associated with at least one of a location and bandwidth parameter, a subcarrier spacing (SCS), or a cyclic prefix (CP) based on the initial UL BWP; and
      transmit, to the network entity based on the configuration, the one or more positioning SRS outside of the initial UL BWP, wherein the one or more positioning SRS is configured to be transmitted during the idle state or the inactive state.

2. The apparatus of claim 1, wherein the set of constraints includes a second constraint that an offset to a carrier configuration of the initial UL BWP is same as the offset to a carrier used for the BWP associated with the one or more positioning SRS or the configuration of the one or more positioning SRS.

3. The apparatus of claim 1, wherein the BWP associated with the one or more positioning SRS is paired with an initial downlink (DL) BWP.

4. The apparatus of claim 1, wherein the one or more capabilities includes that the UE supports at least one connected mode configuration where a BWP associated with the one or more positioning SRS is an active BWP and the UE supports switching between the BWP associated with the one or more positioning SRS and the initial UL BWP.

5. The apparatus of claim 1, wherein the one or more capabilities further comprises that the UE supports switching between the initial UL BWP and the BWP associated with the one or more positioning SRS.

6. The apparatus of claim 1, wherein the one or more capabilities further comprises that the UE supports a same SCS and a same CP between the initial UL BWP and a BWP associated with the one or more positioning SRS without supporting different SCS or CP between the initial UL BWP and the BWP associated with the one or more positioning SRS.

7. The apparatus of claim 1, wherein the one or more capabilities further comprises whether the UE supports different numerology between the one or more positioning SRS outside of the initial UL BWP and the initial UL BWP.

8. The apparatus of claim 1, wherein a BWP associated with the one or more positioning SRS is in a same frequency band with the initial UL BWP.

9. The apparatus of claim 8, wherein the one or more capabilities further comprises whether the BWP associated with the one or more positioning SRS is in a different carrier as the initial UL BWP.

10. The apparatus of claim 1, wherein the one or more capabilities further comprises that the UE supports switching between a BWP associated with the one or more positioning SRS and the initial UL BWP with or without a switching gap.

11. The apparatus of claim 1, wherein the one or more capabilities of supporting SRS transmission outside of an initial BWP is reported on a per-band basis, wherein the capability includes at least one supported SCS, at least one supported CP, or at least one supported SRS BW.

12. The apparatus of claim 1, wherein the one or more capabilities further comprises whether a same center frequency is associated with an initial BWP and the one or more positioning SRS.

13. The apparatus of claim 1, wherein the network entity is a transmission-reception point (TRP) or a base station.

14. An apparatus for wireless communication at a network entity, comprising:
   memory;
   a transceiver; and
   at least one processor communicatively connected to the memory and the transceiver, the at least one processor configured to:
      receive a one or more capabilities for a transmission of one or more positioning sounding reference signals (SRS) outside of an initial uplink (UL) bandwidth part (BWP) during an idle state or an inactive state of a user equipment (UE), wherein the one or more capabilities comprises at least one of:
         whether the UE supports the one or more positioning SRS outside of the initial UL BWP that can have a bandwidth which does not include a synchronization signal block (SSB) or control resource set 0 (CORESET 0),
         whether the UE supports different center frequency between the one or more positioning SRS outside of the initial UL BWP and the initial UL BWP,
         or any combination thereof;
      transmit a configuration, based at least in part on the one or more capabilities, for the transmission of the one or more positioning SRS outside of the initial UL BWP during the idle state or the inactive state, wherein the configuration includes a set of constraints on the transmission of the one or more positioning SRS, and wherein the set of constraints includes a first constraint that a BWP associated with the one or more positioning SRS or the configuration of the one or more positioning SRS is associated with at least one of a location and bandwidth parameter, a subcarrier spacing (SCS), or a cyclic prefix (CP) based on the initial UL BWP; and receive, based on the configuration, the one or more positioning SRS outside of the initial UL BWP, wherein the one or more positioning SRS is configured to be received during the idle state or the inactive state.

15. The apparatus of claim 14, wherein the set of constraints includes a second constraint that an offset to a carrier associated with the initial UL BWP is used for the BWP associated with the one or more positioning SRS.

16. The apparatus of claim 14, wherein the BWP associated with the one or more positioning SRS corresponds to the initial UL BWP.

17. The apparatus of claim 14, wherein one or more capabilities includes that the UE supports at least one connected mode configuration where a BWP associated with the one or more positioning SRS is an active BWP and the UE supports switching between the BWP associated with the one or more positioning SRS and the initial UL BWP.

18. The apparatus of claim 17, wherein the one or more capabilities further comprises that the UE supports switching between the initial UL BWP and the BWP associated with the one or more positioning SRS.

19. The apparatus of claim 14, wherein one or more capabilities further comprises that the UE supports a same SCS and a same CP between the initial UL BWP and a BWP associated with the one or more positioning SRS without supporting different SCS or CP between the initial UL BWP and the BWP associated with the one or more positioning SRS.

20. The apparatus of claim 14, wherein one or more capabilities further comprises whether the UE supports different numerology between the one or more positioning SRS outside of the initial UL BWP and the initial UL BWP.

21. The apparatus of claim 14, wherein a BWP associated with the one or more positioning SRS is in a same band with the initial UL BWP.

22. The apparatus of claim 21, wherein the BWP associated with the one or more positioning SRS is in a different carrier with the initial UL BWP.

23. The apparatus of claim 14, wherein one or more capabilities further comprises that the UE supports switching between a BWP associated with the one or more positioning SRS and the initial UL BWP with or without a switching gap.

24. The apparatus of claim 14, wherein one or more capabilities is associated with a band for SRS outside of an initial BWP, and the band includes at least one supported SCS, at least one supported CP, or at least one supported SRS BW.

25. The apparatus of claim 14, wherein one or more capabilities further comprises whether a same center frequency is associated with an initial BWP and the one or more positioning SRS.

26. The apparatus of claim 14, wherein the network entity is a transmission-reception point (TRP) or a base station.

27. A method of wireless communication at a user equipment (UE), comprising:

transmitting, to a network entity, one or more capabilities for a transmission of one or more positioning sounding reference signals (SRS) outside of an initial uplink (UL) bandwidth part (BWP) during an idle state or an inactive state of the UE, wherein the one or more capabilities comprises at least one of:

whether the UE supports the one or more positioning SRS outside of the initial UL BWP that can have a bandwidth which does not include a synchronization signal block (SSB) or control resource set 0 (CORE-SET 0), whether the UE supports different center frequency between the one or more positioning SRS outside of the initial UL BWP and the initial UL BWP, or any combination thereof;

receiving, from the network entity a configuration, based at least in part on the one or more capabilities, for the transmission of the one or more positioning SRS outside of the initial UL BWP during the idle state or the inactive state, wherein the configuration includes a set of constraints on the transmission of the one or more positioning SRS, and wherein the set of constraints includes a first constraint that a BWP associated with the one or more positioning SRS or the configuration of the one or more positioning SRS is associated with at least one of a location and bandwidth parameter, a subcarrier spacing (SCS), or a cyclic prefix (CP) based on the initial UL BWP; and transmitting, to the network entity based on the configuration, the one or more positioning SRS outside of the initial UL BWP, wherein the one or more positioning SRS is configured to be transmitted during the idle state or the inactive state.

28. The method of claim 27, wherein the set of constraints includes a second constraint that an offset to a carrier configuration of the initial UL BWP is same as the offset to a carrier used for the BWP associated with the one or more positioning SRS or the configuration of the one or more positioning SRS.

29. The method of claim 27, wherein the one or more capabilities includes that the UE supports at least one connected mode configuration where a BWP associated with the one or more positioning SRS is an active BWP and the UE supports switching between the BWP associated with the one or more positioning SRS and the initial UL BWP.

30. The method of claim 27, wherein the one or more capabilities further comprises whether the UE supports different numerology between the one or more positioning SRS outside of the initial UL BWP and the initial UL BWP.

31. A method of wireless communication at a network entity, comprising:

receiving one or more capabilities for a transmission of one or more positioning sounding reference signals (SRS) outside of an initial uplink (UL) bandwidth part (BWP) during an idle state or an inactive state of a user equipment (UE), wherein the one or more capabilities comprises at least one of:

whether the UE supports the one or more positioning SRS outside of the initial UL BWP that can have a bandwidth which does not include a synchronization signal block (SSB) or control resource set 0 (CORE-SET 0), whether the UE supports different center frequency between the one or more positioning SRS outside of the initial UL BWP and the initial UL BWP, or any combination thereof;

transmitting a configuration, based at least in part on the one or more capabilities, for the transmission of the one or more positioning SRS outside of the initial UL BWP during the idle state or the inactive state, wherein the configuration includes a set of constraints on the transmission of the one or more positioning SRS, and wherein the set of constraints includes a first constraint that a BWP associated with the one or more positioning SRS or the configuration of the one or more positioning SRS is associated with at least one of a location and bandwidth parameter, a subcarrier spacing (SCS), or a cyclic prefix (CP) based on the initial UL BWP; and receiving, based on the configuration, the one or more positioning SRS outside of the initial UL BWP, wherein the one or more positioning SRS is configured to be received during the idle state or the inactive state.

32. The method of claim 31, wherein the set of constraints includes a second constraint that an offset to a carrier configuration of the initial UL BWP is same as the offset to a carrier used for the BWP associated with the one or more positioning SRS or the configuration of the one or more positioning SRS.

33. The method of claim 31, wherein the one or more capabilities includes that the UE supports at least one connected mode configuration where a BWP associated with the one or more positioning SRS is an active BWP and the UE supports switching between the BWP associated with the one or more positioning SRS and the initial UL BWP.

34. The method of claim 31, wherein the one or more capabilities further comprises whether the UE supports different numerology between the one or more positioning SRS outside of the initial UL BWP and the initial UL BWP.

* * * * *